(12) United States Patent
Yanagihara

(10) Patent No.: US 7,855,979 B2
(45) Date of Patent: Dec. 21, 2010

(54) SEPARABILITY CONTROL DEVICE, TREE-TYPE DELIVERY SYSTEM, NODE DEVICE SEPARATION CONTROL METHOD, MEMORY MEDIUM MEMORIZING SEPARABILITY CONTROL PROGRAM, MEMORY MEDIUM MEMORIZING INFORMATION PROCESS PROGRAM

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 40 days.

(21) Appl. No.: 12/320,479

(22) Filed: Jan. 27, 2009

(65) Prior Publication Data

US 2009/0147785 A1 Jun. 11, 2009

Related U.S. Application Data

(63) Continuation-in-part of application No. PCT/JP2007/065711, filed on Aug. 10, 2007.

(30) Foreign Application Priority Data

Sep. 29, 2006 (JP) .............................. 2006-267396

(51) Int. Cl.
H04L 12/28 (2006.01)
(52) U.S. Cl. ...................... 370/254; 370/390; 370/432
(58) Field of Classification Search ....................... None
See application file for complete search history.

(56) References Cited

U.S. PATENT DOCUMENTS

| 5,634,011 | A * | 5/1997 | Auerbach et al. ........... 709/242 |
| 7,596,595 | B2 * | 9/2009 | Budge et al. ............... 709/204 |
| 2006/0187950 | A1 * | 8/2006 | Bou-Diab et al. ........... 370/432 |
| 2009/0116412 | A1 * | 5/2009 | Yanagihara ................. 370/256 |
| 2009/0147785 | A1 * | 6/2009 | Yanagihara ................. 370/390 |

FOREIGN PATENT DOCUMENTS

JP A-2006-033514 2/2006

OTHER PUBLICATIONS

Kazuyuki Shuto, "Application-so Multicast: Kihon to Oyo," UNIX magazine, vol. 21, No. 6, pp. 34-43; 2006.
Nakazawa et al., "Ketsugo to Anteisei ni Motozuku Application Layer Multicast Haiso Tree no Jisso to Hyoka," Transactions of Information Processing Society of Japan, vol. 47, No. 2, pp. 382-391, 2006.
Yoshikawa et al., "NS2005-144 Setsuzoku Anteisei o Koryo shita ALM Tree Kochikuho," IEICE Technical Report, vol. 105, No. 470, pp. 45-48, 2005.

* cited by examiner

*Primary Examiner*—Robert W Wilson
(74) *Attorney, Agent, or Firm*—Oliff & Berridge, PLC

(57) ABSTRACT

A separability control device formed by connecting plural node devices in a tree-like shape while forming plural hierarchy levels placing a delivery device at a top to enable content data from the delivery device to be sequentially transferred from the node device on an upper hierarchy level to the node device on an lower hierarchy level, including:
a simultaneous separation process upper limit number determination means for determining a simultaneous separation process upper limit number being an upper limit number of the node devices capable of separating simultaneously based on the number of the participating node devices;
a separation request information receiving means; and
a separation permission notification means for sending a separation permission notification of permitting the node device being a separation request information sending source when the number of the node devices currently under the separation process does not reach the simultaneous separation process upper limit number.

13 Claims, 17 Drawing Sheets

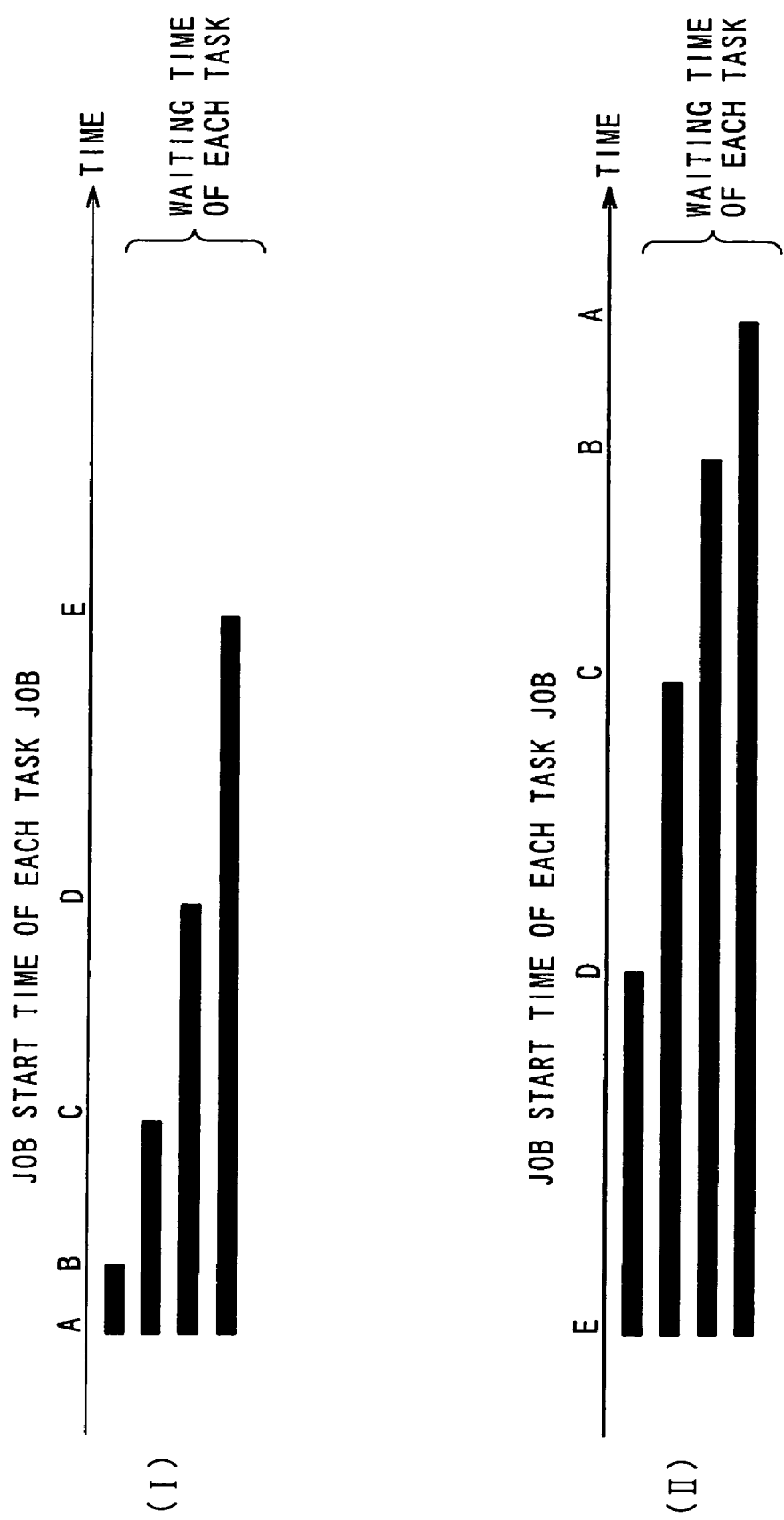

SEPARABILITY CONTROL DEVICE, TREE-TYPE DELIVERY SYSTEM, NODE DEVICE SEPARATION CONTROL METHOD, MEMORY MEDIUM MEMORIZING SEPARABILITY CONTROL PROGRAM, MEMORY MEDIUM MEMORIZING INFORMATION PROCESS PROGRAM

The entire disclosures of Japanese Patent Application No. 2006-267396 filed on Sep. 29, 2006 including the specification, claims, drawings and summary are incorporated herein by reference in its entirety.

BACKGROUND OF THE INVENTION

1. Field of the Invention

The present invention belongs to the field of a separation control method of a node device in a tree-type delivery system formed by participation of plural node devices.

2. Discussion of the Related Art

A content delivery system employing a technology of ALM (Application Layer Multicast) bears a potential risk that delivery topology (content delivery path) is disturbed by separation of a node device (visual terminal). Particularly, in a case of a broadcast-type (tree-type) delivery system that emphasizes synchronism of content delivery, streams are not supplied to the node device connected as a lower hierarchy level in the delivery path of the separated node device unless a disconnection state of the delivery path that is caused by separation of the node device is recovered in a short time. Accordingly, there occur troubles such that reproduction of the content stops in the node device connected as the lower hierarchy level and chain disintegration of a downstream topology is promoted.

To cope with such the problems, there has been provided a conventional method of employing a redundant connection that plural upstream nodes being stream supply sources are provided, in other words, content delivery is received from plural node devices simultaneously to prepare the separation of node devices. In this case, it is possible to get a time extension until a new upstream node device is rediscovered because stream supply of the other upstream node devices is available, even a stream supply from a single upstream node device stops.

In a method that a plurality of upstream node devices are provided, there is disclosed an operation method that a state where a stream is not received from nodes other than a main node (a state that only a connection procedure is completed) is maintained, one of upstream node devices in a suspended state is selected upon the stream stop of the main node thereby resuming the stream supply promptly (Vide Patent Document 1).

Patent Document 1: Japanese Unexamined Patent Publication No. 2006-33514

SUMMARY OF THE INVENTION

Meanwhile, in any cases of the above-mentioned conventional, because there are provided a control method that features redundancy of node connection provided with plural upstream nodes being a stream supply source, it is possible to cope with local node separation problems in a system and is not possible to sufficiently deal with multiple node separation problems that occur simultaneously in an entire system.

The present invention is provided in consideration of the above problems. An object of the present invention is to provide a separability control device or the like where separation triggers of participation node devices are controlled in a system as a whole to secure stability of delivery topology where connection status changes constantly, thereby preventing topology collapse to realize highly-stable tree-type delivery system.

To solve the above problem, according to the invention recited in Claim 1, there is provided a separability control device controlling separability from a tree-type delivery system formed by participation of a plurality of node devices by connecting the plurality of node devices in a tree-like shape while forming a plurality of hierarchy levels placing a delivery device at a top thereof to enable content data delivered from the delivery device to be sequentially transferred from the node device on an upper hierarchy level to the node device on an lower hierarchy level, the separability control device including:

a simultaneous separation process upper limit number determination means for acquiring a number of the node devices participating in the tree-type delivery system, and determining a simultaneous separation process upper limit number being an upper limit number of the node devices capable of separating simultaneously from the tree-type delivery system, based on the number of the participating node devices;

a separation request information receiving means for receiving separation request information of requesting separation from the tree-type delivery system from any one of the node devices; and a separation permission notification means for judging whether or not the number of the node devices currently under a separation process reaches the simultaneous separation process upper limit number, and sending a separation permission notification of permitting the separation process to the node device being a separation request information sending source in a case where the number of the node devices currently under the separation process does not reach the simultaneous separation process upper limit number, and not sending the separation permission notification to the node device being the separation request information sending source in a case where the number of the node devices currently under the separation process reaches the simultaneous separation process upper limit number.

According to this, the separability control device determines the simultaneous separation process upper limit number based on a number of the node devices participating in the tree-type delivery system, and it is allowed for the node device of the sending source of the separation request information to separate in a case where the number of the node devices currently processed to be separated does not reach the simultaneous separation process upper limit number and it is not allowed for the node device of the sending source of the separation request information in a case where the number reaches the simultaneous separation process upper limit number, whereby it is possible to control the separation of the node device in the delivery topology in the entire tree-type distribution system thereby improving the topology stability.

According to the present invention, because nodes participating in the tree-type delivery system are capable of localizing instability caused by separating from delivery topology, it is possible to maintain delivery topology in a stable condition.

BRIEF DESCRIPTION OF THE DRAWINGS

FIG. 17 is a graphical illustration of a task process and waiting time.

DESCRIPTION OF THE PREFERRED EMBODIMENTS

Figure 1:
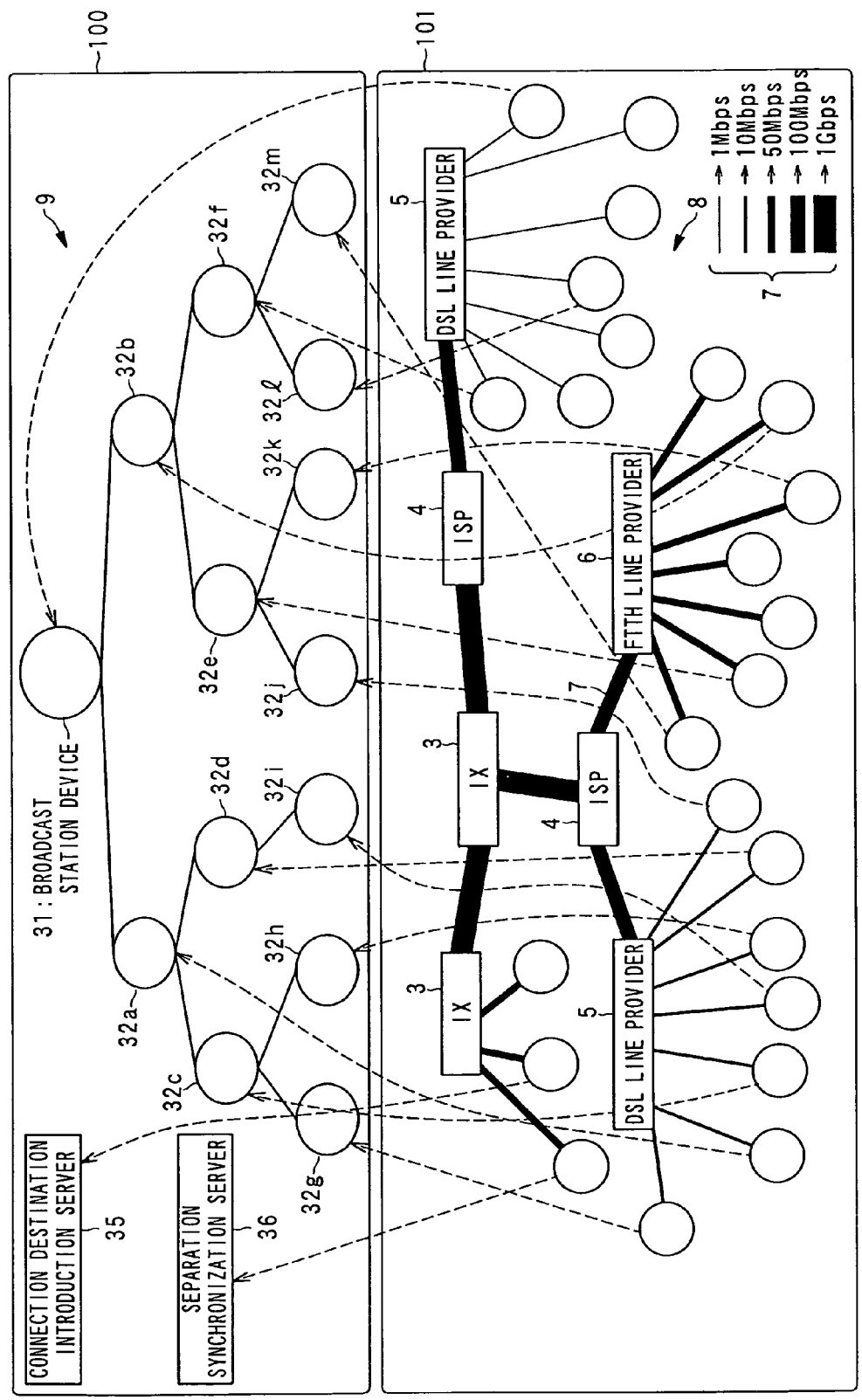
FIG. 1 is a view showing an example of connection status of respective node devices in a content delivery system S according to the present embodiment.

Preferred embodiments of the present invention will be described, wherein each designation of numerical reference in the drawings is typically as follows:

Hereinafter, each designation of numerical reference in the drawings is typically as follows:
1 Node device;
8 Network;
11 CPU;
12 Main memory device;
13 Hard disk device;
14 Peripheral device control chip;
15 Video chip;
16 Built-in display;
17 Sound source chip;
18 Built-in speaker;
19 Infrared port;
21 Network interface;
22 System bus;
23 User input remote controller;
24 Router; and
S Content delivery system Hereinafter, embodiments of the present invention will be described in reference of figures. In the embodiments described below, the present invention is applied to a content delivery system. Here, respective inventions including content delivery system according to the present invention are not limited to the embodiments described below but are appropriately modified and practiced within a scope of the technical concept of the present invention.

[1. Outlines or the Like of Content Delivery System]

First, with reference to FIG. 1, a configuration or the like of a content delivery system S according to the present embodiment is described.

FIG. 1 is a graphical illustration showing an example of connection status of respective devices in the content delivery system S according to the present embodiment.

As shown in lower frame 101 in FIG. 1, a network (network in real world) 8 of the Internet or the like is constructed by an internet exchange (IX) 3, internet service providers (ISP) 4, digital subscriber line (DSL) providers (or device thereof) 5, fiber to the home (FTTH) line providers (or device thereof) 6, and communication lines (e.g. a phone line or an optical cable) 7 and the like.

The content delivery system S is provided with plural node devices 32a, 32b, 32c . . . 32m, that are mutually connected through such the network 8, and the system is a peer-to-peer type network system. Further, an inherent manufacturing number and an IP (Internet Protocol) address as information indicative of node device are assigned to respective node devices 32a, 32b, 32c . . . 32m. Such the manufacturing number and IP address do not overlap among plural node devices 32. Here, in a case where any one of the node devices 32a, 32b, 32c . . . 32m is indicated in the description below, it may be referred to as a node device 32 for convenience.

This content delivery system S is configured by a tree-type delivery network by a broadcast station device 31 and respective node devices 32 with the broadcast station device 31 at a top as shown in the upper frame 100 of FIG. 1.

In the content delivery system S, plural node devices 32a to 32m are connected in a tree shape through plural communication paths 33a, 33b, 33c . . . 33m based on respective IP addresses while forming plural hierarchy levels with the broadcast station device 31 at the top. Such the broadcast station device 31 and plural node devices 32a to 32m are connected to a network such as internet through the above-mentioned IX 3, ISP 4, a DSL line provider (device thereof) 5, a FTTH line provider (device thereof) 6, and a communication line 7 or the like. Content data delivered by the broadcast station device 31 are sequentially transferred from the node devices 32a and 32b or the like in the upper hierarchy level to the node devices 32c to 32m in the lower hierarchy level. In other words, they are streamed to the respective node devices 32c to 32m through the respective node devices 32a to 32f.

A connection destination introduction server 35 memorizes a connection mode (which node device is connected to which node device (or the broadcast station device 31)) of the broadcast station device 31 and the respective node devices 32 as topology management information (topology database). For that reason, as shown in for example FIG. 2, in a case where a new node device 32i desires to participate in the content delivery system S, in other words, desires delivery of content data which are delivered by the broadcast station device 31, a connection destination candidate request Sc is sent to the connection destination introduction server 35 as shown by a dashed line in the figure in order to learn the node device 32 being a candidate of the node device 32, in the upper hierarchy level, to which the own is to be connected. Then the connection destination introduction server 35 searches the node device enabled to connect to a downstream side, and sends a search result to the node device 32i as a connection destination candidate notification (Nk{ }). In a case of an example shown in FIG. 2, the node device 32d is selected as a node device, in the upper hierarchy level, to which the node device 32i is to be connected. Device information (including IP address) of the node device 32d is sent to the node device 32i as a connection destination candidate notification (Nk{ }) as shown by a double dashed line in the figure.

Subsequently, the node device 32i sends the connection request information Sp including the own device information as shown by the dotted line in the figure to the node device 32 in the higher hierarchy level to be connected (node device 32d in an example of FIG. 1), based on the device information included in the connection destination candidate notification (Nk{ }), and makes a connection request. When the node device 32d receiving this judges the situation that the content data should be transferred to the node device 32i, it is possible to establish a connection between the node device 32i and the node device 32d through the communication path 33i.

Figure 2:
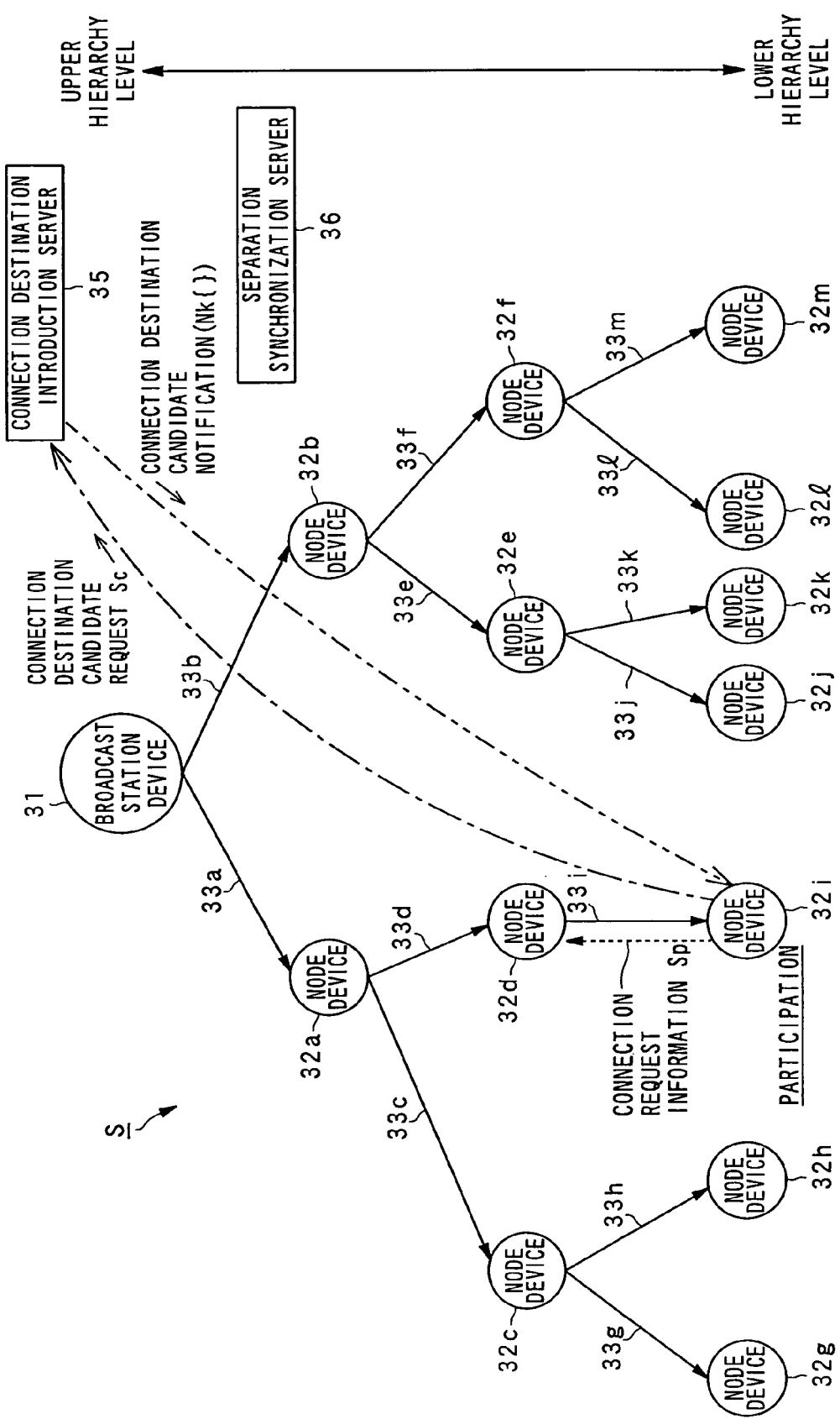
FIG. 2 is a view describing the content delivery system S according to the present embodiment.

In an example shown in FIG. 2, the connection destination introduction server 35 teaches to the node device 32i device information (including IP address) of the node device 32d as a connection destination candidate notification (Nk{ }). However, it may be configured that the connection destination introduction server 35 teaches to the node device 32i device information (including IP address) related to plural node devices if there are plural node devices enabled to connect to the downstream side, selects a single unit of node device in the node device 32i and sends a connection request. Or it may be configured that the node device 32i sends a connection request to plural node devices, selects a single unit of node device among the node devices responding, and receives stream delivery.

Meanwhile, when the node device 32 participating in the system withdraws from the system, because the content data is stopped supply to the downstream node device 32 connected to the node device 32, the downstream node device 32 discovers and reconnects a new upstream node device 32 until consuming up content data buffering in a ring buffer 121 in the own device, and needs to receive content data again from a disruption position of the content data. In order to smoothly complete this series of reconnection procedures, it should be on the premise of the delivery topology stabilized as a whole. However, because the delivery topology becomes unstable when many nodes carrying out reconnection procedures in the delivery topology exist, a separation synchronization server 36 is installed as a separability control device that controls separation trigger of respective nodes as a delivery topology as a whole. Specifically, in order to prevent plural node devices 32 from separating from the system multiply and simultaneously, this separation synchronization server 36 permits separation to the node device 32 that desires to separate, or notifies separability to instruct suspension.

Figure 3:
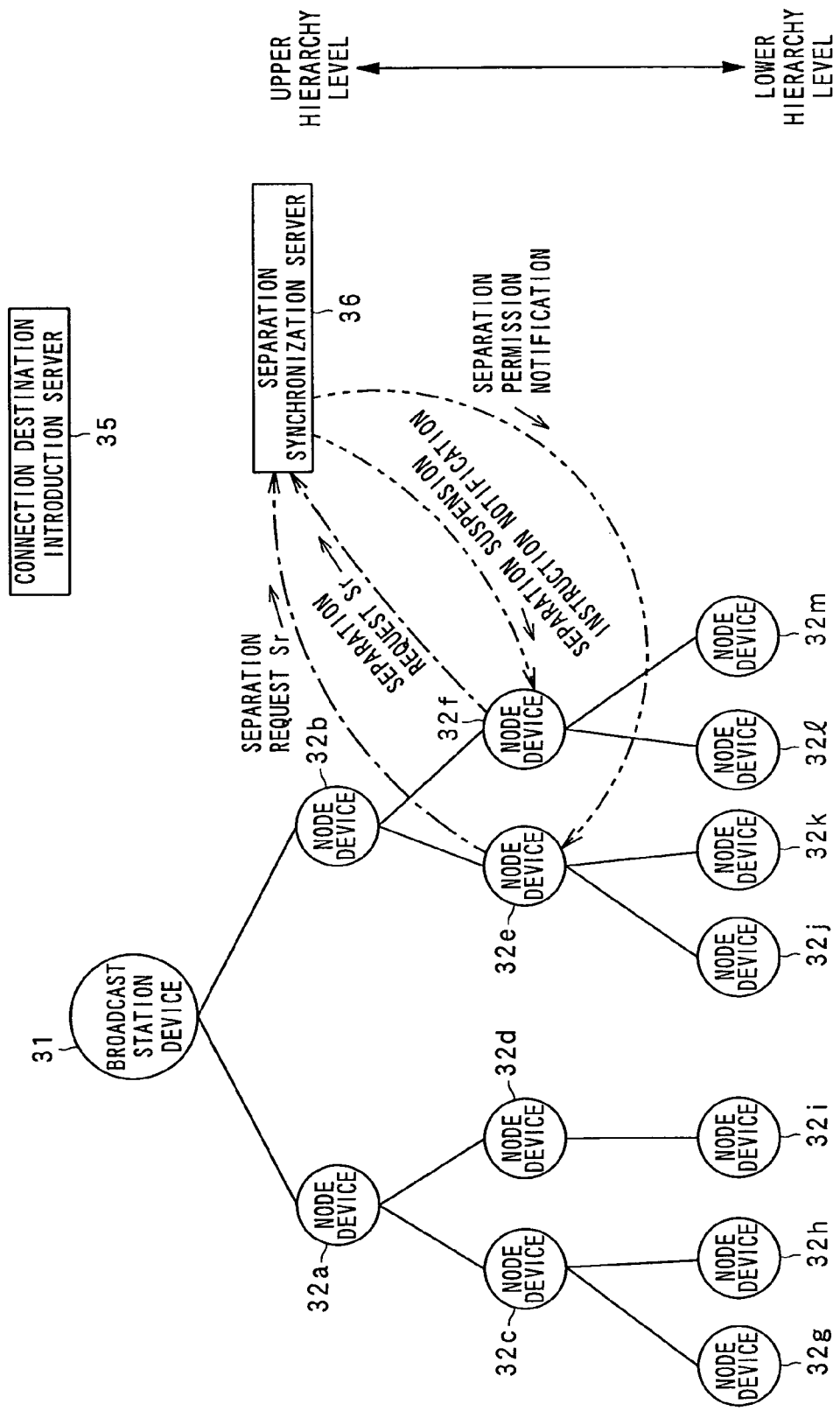
FIG. 3 is a graphical illustration showing a state that a node device 32 separates from the content delivery system S.

As shown in FIG. 3, the node device 32e participating in the content delivery system S desires to separate from the content delivery system S, for example, the user powers off the node device 32 (stops viewing contents), or to separate from the tree with the broadcast station device 31 at a top, by changing channel, in order to move to the other tree with the other broadcast station device (not shown) at a top. In a case where connection with the upstream node device 32b is cut off, the node device 32e first sends the separation request Sr (separation request information) as shown by a dashed line in the figure in order to obtain a separation permission with respect to the separation synchronization server 36. Accordingly when judging that separation is permitted, the separation synchronization server 36 sends a separation permission notification to say that separation is permitted to the node device 32e as shown by a double dashed line in the figure. When receiving the separation permission notification, the node device 32e disconnects the upstream node device 32b and carries out a separation process. On the other hand, as shown by the node device 32f in the same figure, when the separation synchronization server 36 judges that separation is impossible despite receipt of the separation request Sr, the separation suspension instruction notification to instruct that separation is suspended is returned to the node device 32f being the separation request Sr sending source in some cases.

The separation synchronization server 36 determines whether or not the node device 32 desiring to separate is separable, and determines which node device 32 is separated on a priority basis in conformity with the following criteria:

(1) Permitting only predetermined rate of all node devices 32;

(2) Determining separability based on the subtree to which the node device 32 desiring separation belongs;

(3) Determining priority of separation permission based on the number of node devices 32 intervening between the broadcast station device 31 and the node device 32 desiring the separation; and (4) Determining priority of separation permission based on the number of node devices 32 connected as lower hierarchy level of the node devices 32 desiring separation.

Detailed description of the above criteria is described hereinafter.

(1) Permitting Separation Only at a Predetermined Rate of all the Node Devices 32

First, a configuration that the separation synchronization server 36 permits only predetermined rate of node devices 32 among all node devices 32 participating in the content delivery system S is described in reference of FIG. 3.

In the content delivery system S shown in FIG. 3, 14 units of node devices 32 participate. For example, it is set such that 8% or less of node devices 32 among all the node devices 32 may simultaneously carry out the separation process. Then, the upper limit number of the node devices 32 that can simultaneously carry out the separation process is one unit. Accordingly, the separation synchronization server 36 sends the separation permission notification to only one unit of node device in a case where the separation synchronization server 36 simultaneously receives separation requests Sr from two or more units of node devices 32, and sends a separation suspension instruction notification to instruct that separation is suspended to the other node devices. In an example shown in FIG. 3, the separation synchronization server 36 receives a separation request Sr from the node devices 32e and 32f, sends the separation permission notification to the node device 32e and sends the separation suspension instruction notification to the node device 32f. In this way, the separation synchronization server 36 sets up the upper limit number of the node devices that are capable of carrying out separation process simultaneously based on the number of all node devices participating in the content delivery system S. Therefore, it is possible to avoid occurrence of unsubscribe (delivery interruption) due to multiple and simultaneous separation processes of a lot of node devices in the delivery topology of the entire content delivery system S.

Here, the separation synchronization server 36 acquires "topology size" being the number of the all node devices participating in the current content delivery system S, from the connection destination introduction server 35 memorizing (managing) topology management information, thereby configuring such that the upper limit number of the node devices 32 separable simultaneously is updated. Further, according to the present embodiment, although the predetermined rate of node devices separable simultaneously among all node devices 32 is set up to the 8%, the upper limit number of the node devices 32 separable simultaneously may be updated by changing the rate. For example, if it is judged that the number of the node devices 32 stably remaining in the content delivery system S is large, it is possible to increase the upper limit number of the node devices 32 separable simultaneously by increasing the predetermined rate. Further, it is possible that the separation synchronization server 36 freely sets frequency of updating the upper limit number of the node devices 32 separable simultaneously. For example, when a trigger of topology size acquisition is set up once a minute, the separation synchronization server 36 acquires a topology size from the connection destination introduction serve 35 from once a minute to update the upper limit number of the node devices 32 separable simultaneously.

Figure 4:
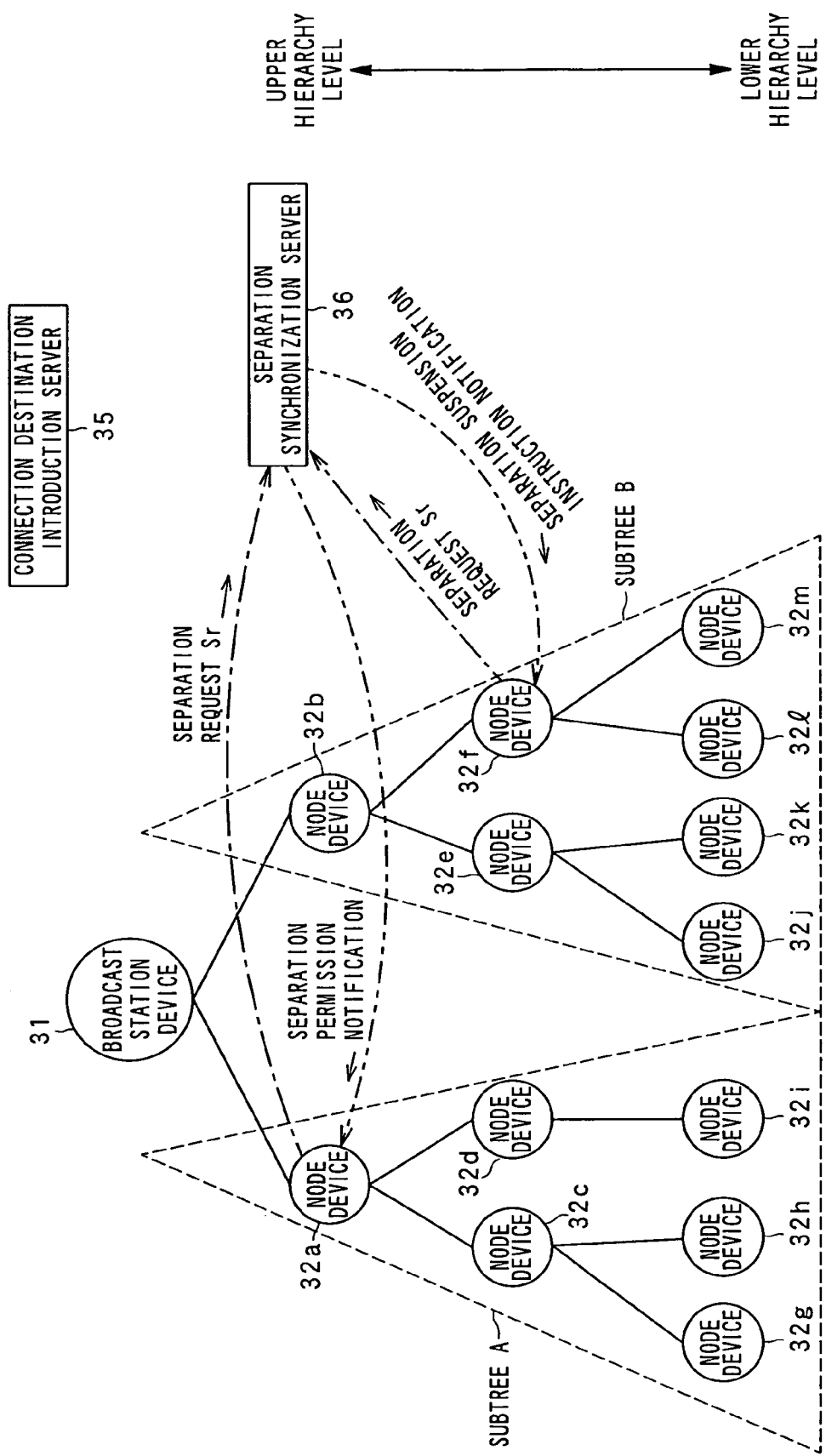
FIG. 4 is a graphical illustration showing criteria of separability when the node device 32 separates from the content delivery system S.

(2) Determining Separability Based on the Subtree to which the Node Device 32 Desiring Separation Belongs Next, a configuration that the separation synchronization server 36 determines separability based on the subtree to which the node device 32 desiring separation belongs is described with FIG. 4.

The content delivery system S shown in FIG. 4 constructs two subtrees A and B by node devices 32a and 32b that are connected to the immediately lower hierarchy level of the broadcast station device 31, using the two subtrees A and B at a top of the sub trees respectively. In this case, the plural node devices 32 belonging to the subtrees A and B are separated and disconnected from the content delivery system S, many node devices 32 that are connected to the downstream of respective node devices 32 is subjected to delivery interruption. Particularly, there is a problem that in a case where the node devices 32 to be separated is located in the vicinity of the broadcast station device 31 (a number of node devices intervening in the interval from the broadcast station device 31 is small), a device that can be connected by the node devices 32 with its delivery interrupted may only be the broadcast station device 31. For example, in a case where the node devices 32a and 32b withdrawn, all node devices 32c to 32m connected to the downstream of the node devices 32a and 32b are required to be reconnected.

Accordingly, it is configured that the separation synchronization server 36 sends the separation suspension instruction notification to the node device 32 belonging to the subtree B in a case where the separation synchronization server 36 receives the separation request Sr from the node devices 32 belonging to the subtree B while any one of node devices 32 belonging to the subtree A is under the separation process. As the example shown in FIG. 4, in a case where the separation permission notification is sent to the node device 32a belonging to the subtree A, and when the separation request Sr is received from the node device 32f belonging to the subtree B before the node device 32a makes a separation completion report, the separation suspension instruction notification is sent to the node device 32f. Accordingly, because the separation synchronization server 36 controls in such way that separations of the node devices 32 do not simultaneously occur in all subtrees, it is possible to stabilize the delivery topology of the entire content delivery system S.

Figure 5:
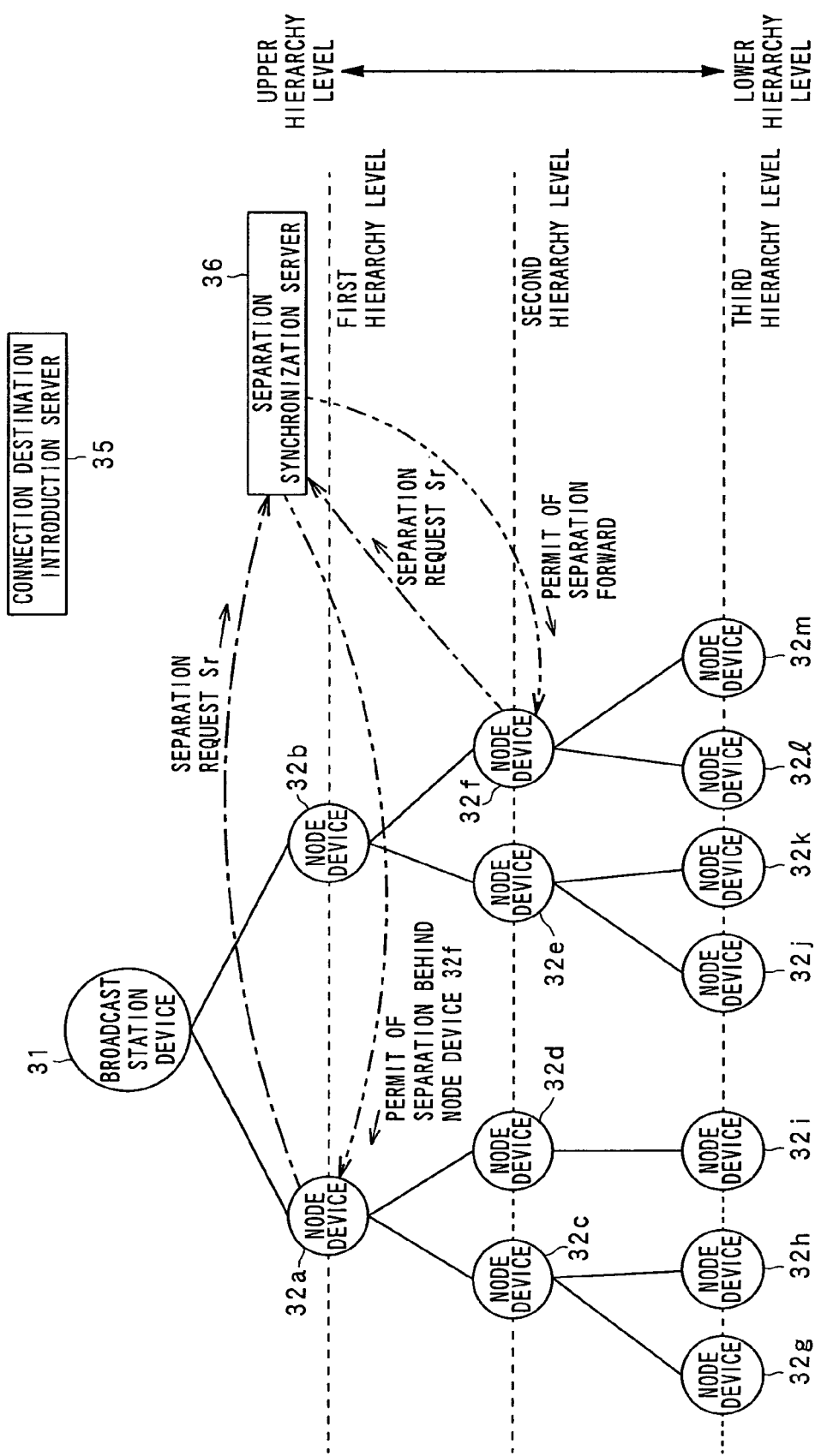
FIG. 5 is a graphical illustration showing a state that the node device 32 separates from the content delivery system S.

(3) Determining Priority of Separation Permission Based on the Number of Node Devices 32 Intervening Between the Broadcast Station Device 31 and the Node Device 32 Desiring the Separation Next, a configuration that the separation synchronization server 36 determines priority of separation permission based on the number of node devices intervening between the broadcast station device 31 of the node device 32 desiring the separation is described with FIG. 5.

As mentioned above, when the node device 32 is separated from the content delivery system S, the topology configuration becomes unstable only for a certain period because the node device 32 connected to the downstream of the node device 32 having separated carries out the connection process again. It is known by investors' experiment that the nearer the node device 32 to separate is located to the broadcast station device 31, the longer the instability time is. Thus in a case where there are plural node devices 32 desiring separation, priority of separation is given to the downstream node device away from the broadcast station device 31, in other words, the node device 32 having the larger number of node devices intervening in the interval with the broadcast station device 31. Further in other words, the number of node devices 32 intervening in the interval with the broadcast station device 31 can be expressed with "the number of hierarchy levels". The level nearer to the broadcast station device 31 (the smaller number of intervening node devices 32) is set up the upper hierarchy level, and the level farther away from the broadcast station device 31 (the larger number of intervening node devices 32) is set up the lower hierarchy level. The smaller the number of the intervening node devices is, the smaller the number of hierarchy levels is. According to an example shown in FIG. 5, the node devices 32a and 32b receiving the content data from the broadcast station device 31 exist in a first hierarchy level, the node devices 32c to 32f receiving the content data from the node devices in the first hierarchy level exist in a second hierarchy level, and the node devices 32g to 32m receiving the content data from the node devices in the second hierarchy level exist in a third hierarchy level. In the example shown in FIG. 5, in a case where the node devices 32a and 32f send the separation request Sr to the separation synchronization server 36, the separation permission notification is sent to the node device 32f in the second hierarchy level on a priority basis in terms of separation permission order.

Here, detailed description of the separation permission order is given together with a separation stabilization time after the description of criteria (4).

Figure 6:
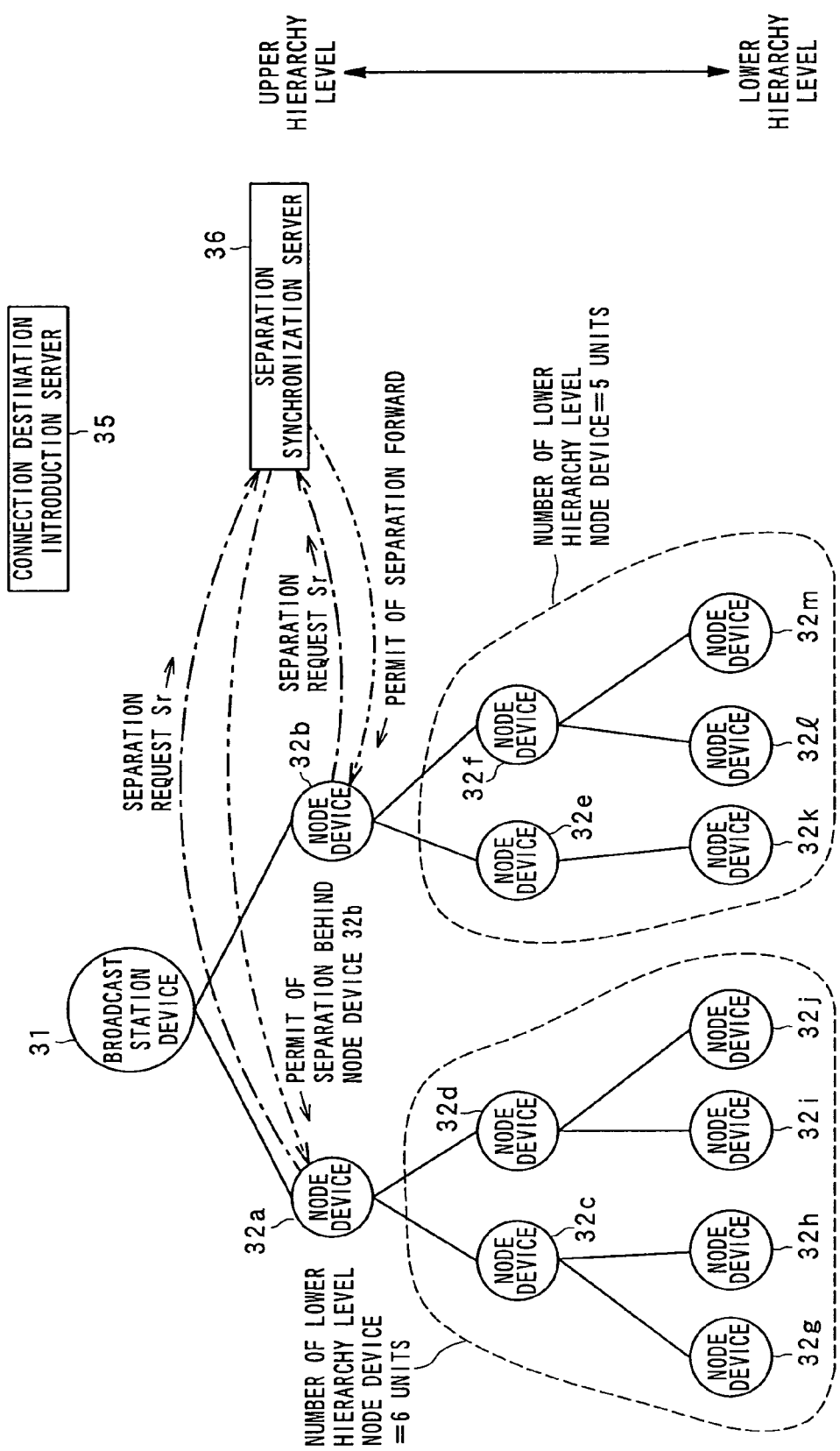
FIG. 6 is a graphical illustration showing a state that the node device 32 separates from the content delivery system S.

(4) Determining Priority of Separation Permission Based on the Number of Node Devices Connected as Lower Hierarchy Level of the Node Devices 32 Desiring Separation Next, a configuration that the separation synchronization server 36 determines priority of separation permission based on the number of node devices 32 connected as lower hierarchy level of the node devices 32 desiring separation is described in reference of FIG. 6.

With respect to an instability time of the topology configuration caused by the reconnection process of the node device 32 connected to the downstream of the node device 32 having separated, it is known by the inventors' experiment that the larger the number of the node devices 32 connected as the lower hierarchy level of the node device 32 to separate is, the longer the instability time is, besides "the nearer to the broadcast station device 31 the node device 32 to separate is, the longer the instability time is" as described in the above (3). Based on this, in a case where there are plural node devices 32 desiring separation, the node devices 32 having the smaller number of node devices 32 connected as the lower hierarchy level is separated on a priority basis. In an example shown in FIG. 6, in a case where the node device 32a having six units of lower hierarchy level node devices and the node device 32b having five units of lower hierarchy level node devices send the separation request Sr to the separation synchronization server 36, the separation permission notification is sent to the node device 32b having the smaller number of lower hierarchy level node devices on priority basis.

Next, the separation stabilization time T is described.

According to the present embodiment, the separation synchronization server 36 predicts the instability time when the topology configuration described in criteria (3) and (4) for determining the node device 32 to be separated on a priority basis becomes instable, as separation stabilization time T and sends the separation permission notification to the node device to separate next after a lapse of this time.

The separation synchronization server 36 calculates the separation stabilization time T(s) of the separation node device 32 by the formula 1 below, where "topology size" being the number of all node devices participating in the current content delivery system S is expressed by Sch, the number of hierarchy levels of the node devices 32 to separate is expressed by hop, the number of the node devices 32 connected as the lower hierarchy level of the node devices 32 to separate is expressed by n, and the maximum branch number from the respective node devices 32 (the number of node devices enabled to connect as the node devices of immediately lower hierarchy level) is set up "3".

[Formula 1]

$$T = \left[\frac{\log_3 Sch}{hop}\right] \times n \times 1 \quad \text{(Formula 1)}$$

The separation synchronization server 36 registers a separation desire node device 32 in a synchronization control queue (vide FIG. 10) for providing the separation permission in an ascending order of the separation stabilization time T. Subsequently separation is permitted in order of registration entry. In a case where the plural node devices 32 simultaneously make separation requests Sr as described with FIGS. 5 and 6, the larger the number of hierarchy level is or the smaller the number of lower hierarchy level node devices is, the smaller value the separation stabilization time T obtains. Therefore, the separation desire node device 32 is registered in the synchronization control queue in the ascending order of the separation stabilization time T. Thereby, the larger number of hierarchy level (Criterion (3)) or the smaller number of the lower hierarchy level node devices (Criterion (4)), separation permission is given on priority basis. An example of a data structure of the synchronization control queue where the registration separation desire node device 32 is registered (entered) is shown in Table 1.

TABLE 1

| ENTRY | SEPARATION PERMISSION FLAG | LOCATION INFORMATION | SEPARATION STABILIZATION TIME T (S) | TIMEOUT TIME | SEPARATION COMPLETION FLAG | SEPARATION STABILIZATION TIME TIMEOUT FLAG |
|---|---|---|---|---|---|---|
| 1 | ON | 210.173.156.72:9001 | 2 | 199347646 | ON | OFF |
| 2 | ON | 211.73.56.72:10001 | 4 | 199349646 | OFF | OFF |
| 3 | OFF | 60.32.64.167:2001 | 5 | 0 | OFF | OFF |
| 4 | OFF | 61.32.122:341 | 6 | 0 | OFF | OFF |

In Table 1, "separation permission flag" expresses whether or not the status is that the separation is permissible, and "ON" expresses the status that the separation is permitted.

Further, "timeout time" is obtained by adding a separation stabilization time to the current time and counted with a computer built-in clock in the separation synchronization server 36.

Further "separation completion flag" expresses whether or not the separation report to say that separation is completed is received from the node device 32. "ON" expresses that the node device 32 completes the separation.

Further, "separation stabilization time timeout flag" expresses whether or not the separation stabilization time T is timed out (passing over), and "ON" expresses that the separation stabilization time T is timed out (passing over).

Here, in a case where separability with respect to the node device 32 desiring separation is determined according to the above mentioned Criterion (2), the synchronization control queue should be managed every subtree. According to the present embodiment, separability is determined with respect to the node device 32 desiring separation according to Criterion (2) and two systems of synchronization control queue are used in response to two subtrees. Here, two units of the data structures of the above Table 1 are prepared for respective subtrees (respective queues Q1 and Q2).

Therefore, because the separation request is monitored while moving an execution authority for giving a separation permission to a queue Q1 of one side subtree and a queue Q2 of the other side subtree, it is possible to configure not to simultaneously carry out the separation processes in the both subtrees. Particularly, when the separation report to say that the separation process is completed is received from the node device 32 belonging to the queue Q1, it is judged whether or not registration information of the node device in a separation permission wait state exists in the queue Q2. When the registration information exists in the queue Q2 and the execution authority exists in the queue Q1, among registration information of the permit wait state in the queue Q2, the execution authority is moved to the queue Q2 and the separation permission flag of the node device next to be permitted to separate is turned "ON". In a case where the registration information of the node devices in a separation permission wait state exists in the queue Q2, the execution authority does not exist in the queue Q1, and the execution authority is already moved to the queue Q2, the execution authority remains and the separation permission flag of the node device next to be permitted of the separation is turned "ON" among registration information of the separation permission wait state in the queue Q2. On the other hand, in a case where the registration information of the node devices in a separation permission wait state does not exist in the queue Q2, the execution authority remains, the execution authority remains, and the separation permission flag of the node device next to be permitted to separate is turned "ON" among registration information of the permit wait state in the queue Q1. Detailed description of movement timing of the execution authority with respect to respective queues is described later using a flowchart.

[2. Configuration or the Like of Respective Devices Forming Content Delivery System]

Configuration or the like of a node device 32, a broadcast station device 31, a connection destination introduction server 35, and a separation synchronization server 36 that form a content delivery system S are described with reference to FIGS. 7 to 10.

[2.1. Configuration or the Like of Node Device]

First, configuration and function of the node device 32 is described with reference to an example of a schematic configuration of the node device 32 shown in FIG. 7. Here, configuration of the respective node devices 32 is the same.

Figure 7:
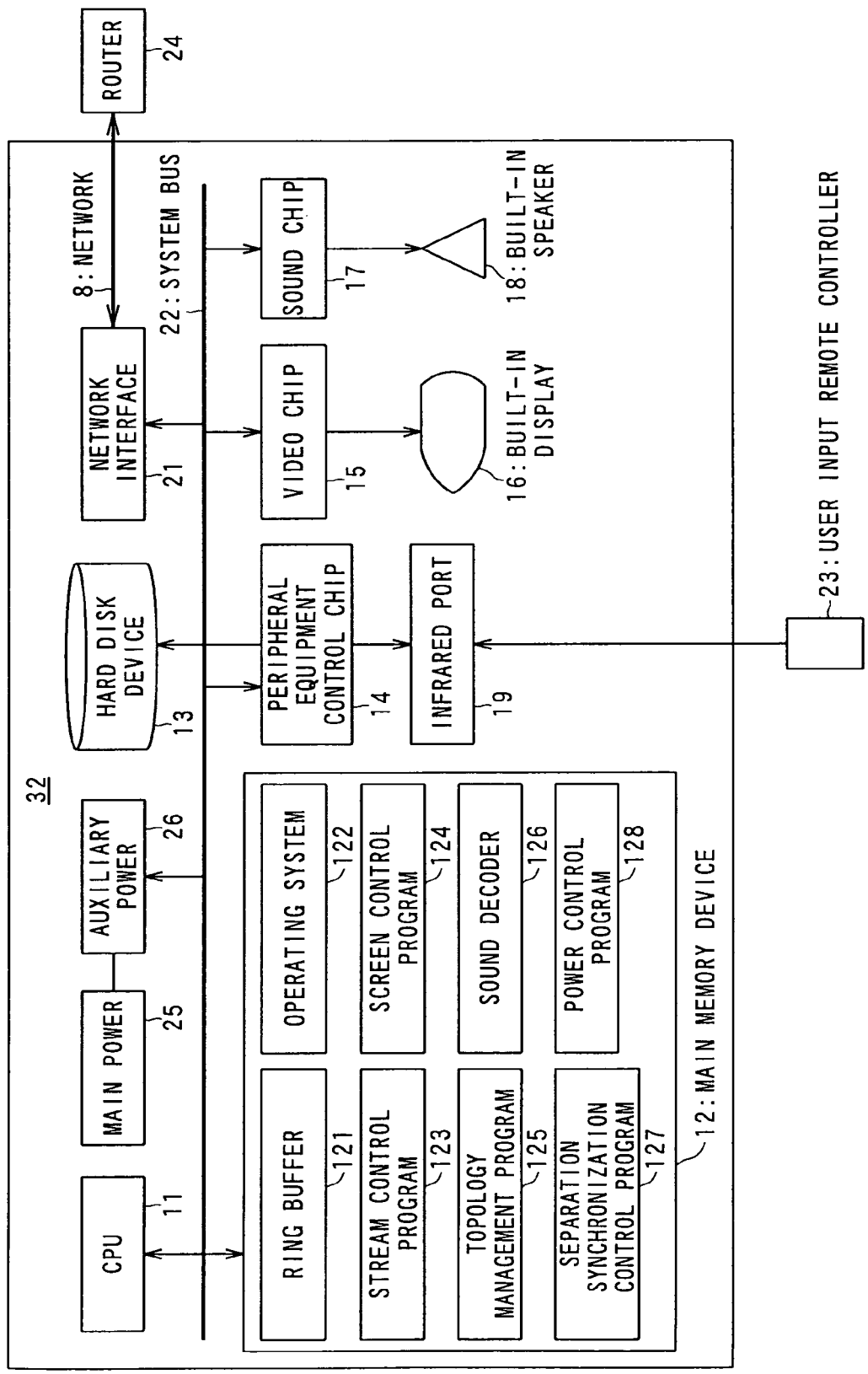
FIG. 7 is a view showing an example of a schematic configuration of the node device 32.

As shown in FIG. 7, respective node devices 32 include: CPU 11 having a computing function; a main memory device 12 including a ring buffer memory 121 temporarily storing received content data or the like, an operating system 122, a stream control program 123, a screen control program 124 decoding (data expansion, decoding or the like) encoded video data (image information) included in the content data or the like, a topology management program 125, a sound decoder 126 decoding (data expansion, decoding or the like) encoded audio data (sound information) included in the content data or the like, a separation synchronization control program 127 as an information process program of the present invention, and a power control program 128, the main memory device 12 including an operation RAM, ROM or the like memorizing various data and programs; a hard disk device 13 as a memorizing medium including HD or the like for memorizing and saving (storing) various data and programs; a peripheral device control chip 14 for controlling connection with peripheral devices such as a hard disk device 13 and an input unit and transferring information; a video chip 15 performing a predetermined drawing process on the decoded video data or the like and outputting as a video signal; a built-in display 16 such as CRT and a liquid crystal display that displays image based on the video signal outputted from the video chip 15; a sound source chip 17 D (Digital)/A (Analog) for converting thus decoded audio data to an analog audio signal and subsequently amplifying this with an amplifier and outputting the same; a built-in speaker 18 outputting an audio signal outputted from the sound source chip 17 as a sound wave; an infrared port 19 (in addition, for example, a keyboard, a mouse, or an operational panel is available) as an input unit accepting an instruction from the user and providing an instruction signal in response to the instruction to the CPU 11; a network interface 21 for controlling information communication with the other node device 32 or the like via a router 24 or the like through a network 8; a main power 25; and a auxiliary power 26. The CPU 11, the main memory device 12, the periphery device control chip 14, the video chip 15, the sound source chip 17, and the network interface 21 are mutually connected through a system bus 22. A network interface 21 is connected with an external router 24 or the like through the network 8. The infrared port 19 receives an instruction signal from a remote controller 23 for the user input and transfers the signal to the peripheral device control chip 14.

The auxiliary power 26 is for switching a power supply to the device from the main power 25 upon a voltage drop of the main power 25 and includes a buttery or the like. During power supply by the auxiliary power 26, only minimum members required for carrying out a stream relay of the CPU 11, the main memory device 12, or the like are in a startup status. In a case where the main power 25 is turned off, the stream relay continues until the separation permission is obtained from the separation synchronization server 36. When the separation permission is obtained, the node device is separated from the topology and the auxiliary power 26 is also off to stop the node device 32. According to this configuration, in a case where the user purposely cuts off the main power 25 of the node device 32, and blackout occurs due to an accident, it is possible to ensure the separation control from the content delivery system S.

The CPU 11 executes various programs memorized in the main memory device 12 or the like to integrally control the entire node device 32. Further, a selection process or the like of participation channels is carried out in response to the instruction signal from the input unit such as remote controller 23. The node device 32 functions as the broadcast station device 31, the node device sending (transferring) information, the node device receiving information, or the like, in response to the executed program. Further, the CPU 11 of the node device 32 functions as the separation request information sending means, the separation permission notification receiving means, the separation process means, and lower hierarchy level node device existence judge means according to the present invention.

[2.2 Configuration or the Like of Broadcast Station Device]

Next, configuration and function of the broadcast station device 31 as a delivery device of the present invention are described with reference to a schematic configuration example of the broadcast station device 31 shown in FIG. 8.

Figure 8:
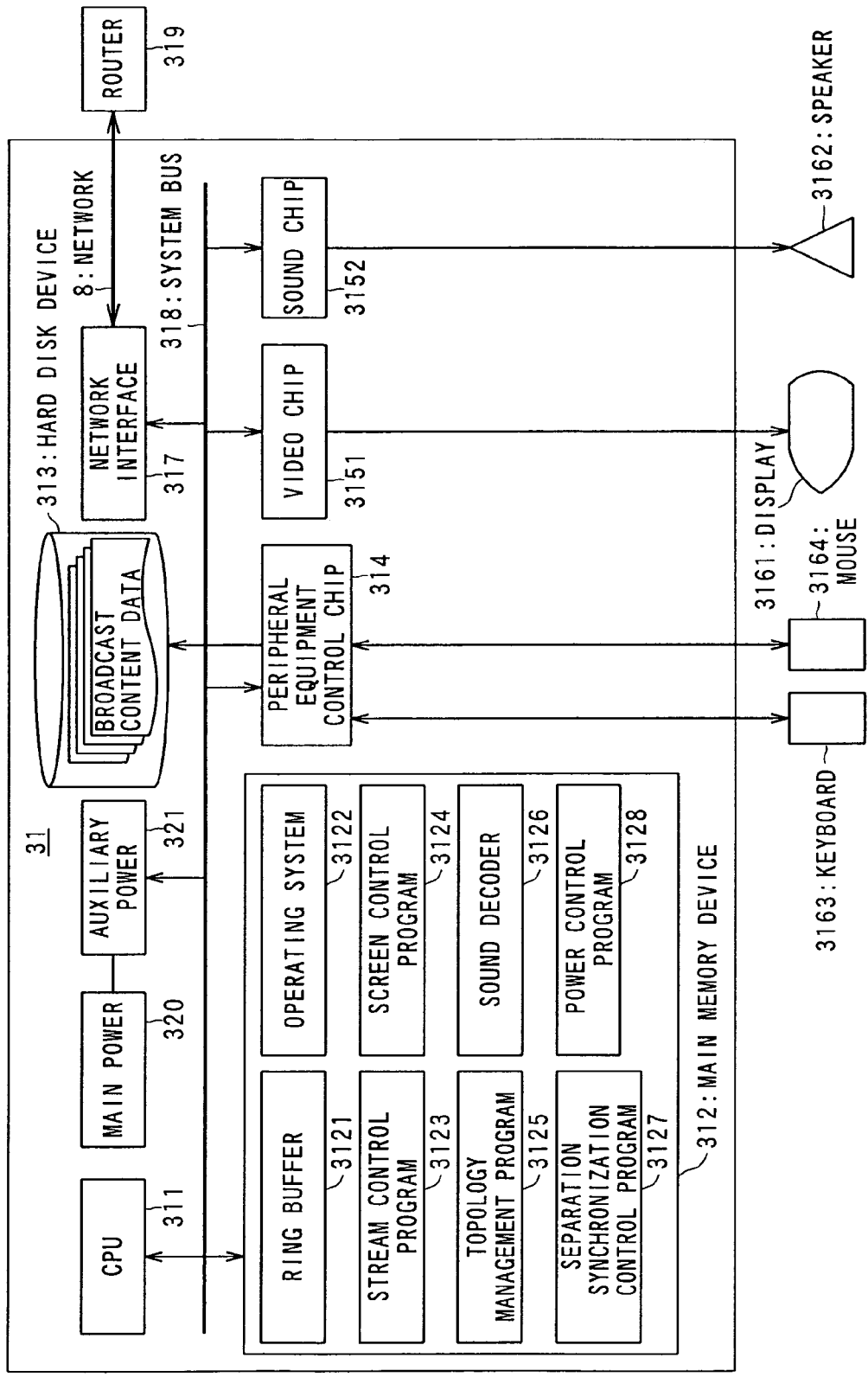
FIG. 8 is a view showing an example of a schematic configuration of a broadcast station device 31.

As shown in FIG. 8, the broadcast station device 31 includes: a CPU 311 having a computing function; a main memory device 312 including a ring buffer memory 3121 temporarily storing first content data received or the like, an operating system 3122, a stream control program 3123, a screen control program 3124 decoding (data expansion, decoding or the like) encoded video data (image information) included in the content data or the like, a topology management program 3125, a sound decoder 3126 decoding (data expansion, decoding or the like) encoded audio data (sound information) included in the content data or the like, a separation synchronization control program 3127, and a power control program 3128, the main memory device 312 including an operation RAM, ROM or the like memorizing various data and programs; a hard disk device 313 including HD or the like for memorizing and saving (storing) content data and programs for broadcast; a peripheral device control chip 314 controlling a connection with peripheral devices such as a hard disk device 313 and an input unit and transferring information; a video chip 3151 performing a predetermined draw treatment on decoded video data or the like and outputting as a video signal; a display 3161 such as CRT and a liquid crystal display that displays image based on the video signal outputted from the video chip 3151; a sound source chip 3152 D (Digital)/A (Analog)-converting thus decoded audio data to an analog audio signal, subsequently amplifying this with an amplifier and outputting; a speaker 3162 outputting the audio signal outputted from the sound source chip 3152 as a sound wave; a keyboard 3163 and a mouse 3164 (in addition, for example an operational remote controller and an operation panel being available) as an input unit accepting an instruction from the user and providing an instruction signal in correspondence with the instruction to the CPU 311; a network interface 317 controlling information communication with the node device 32 or the like via a router 319 or the like through a network 8; a main power 320; and an auxiliary power 321. The CPU 311, the main memory device 312, the peripheral device control chip 314, the video chip 3151, the sound source chip 3152, and the network interface 317 are mutually connected through a system bus 318. The network interface 317 is connected with an external router 319 or the like through the network 8.

The auxiliary power 321 is for switching a power supply from the main power 320 to the device upon voltage drop of the main power 320 and includes a buttery or the like. During power supply by the auxiliary power 321, only minimum members required for carrying out content delivery of the CPU 311, the main memory device 312, or the like are in a startup status. In a case where the main power 320 is turned off, the content delivery continues until a broadcast finish notification packet for transmitting broadcast finish is delivered. When the delivery of the broadcast finish notification packet is completed, the auxiliary power 321 is also turned off to stop the broadcast station device 31. Here, the node device 32 receiving the broadcast finish notification packet stops the reproduction of the content and displays on the built-in display 16 a clause that the broadcast stops.

The CPU 311 executes various programs memorized in the main memory device 312 or the like to integrally control the entire broadcast station device 31. Further, the CPU 311 carries out various processes in response to signal instructions from input units such as the keyboard 3163.

[2.3. Configuration or the Like of Connection Destination Introduction Server]

Next, a configuration and a function of a connection destination introduction server 35 are described with reference to a schematic configuration example of the connection destination introduction server 35 shown in FIG. 9.

Figure 9:
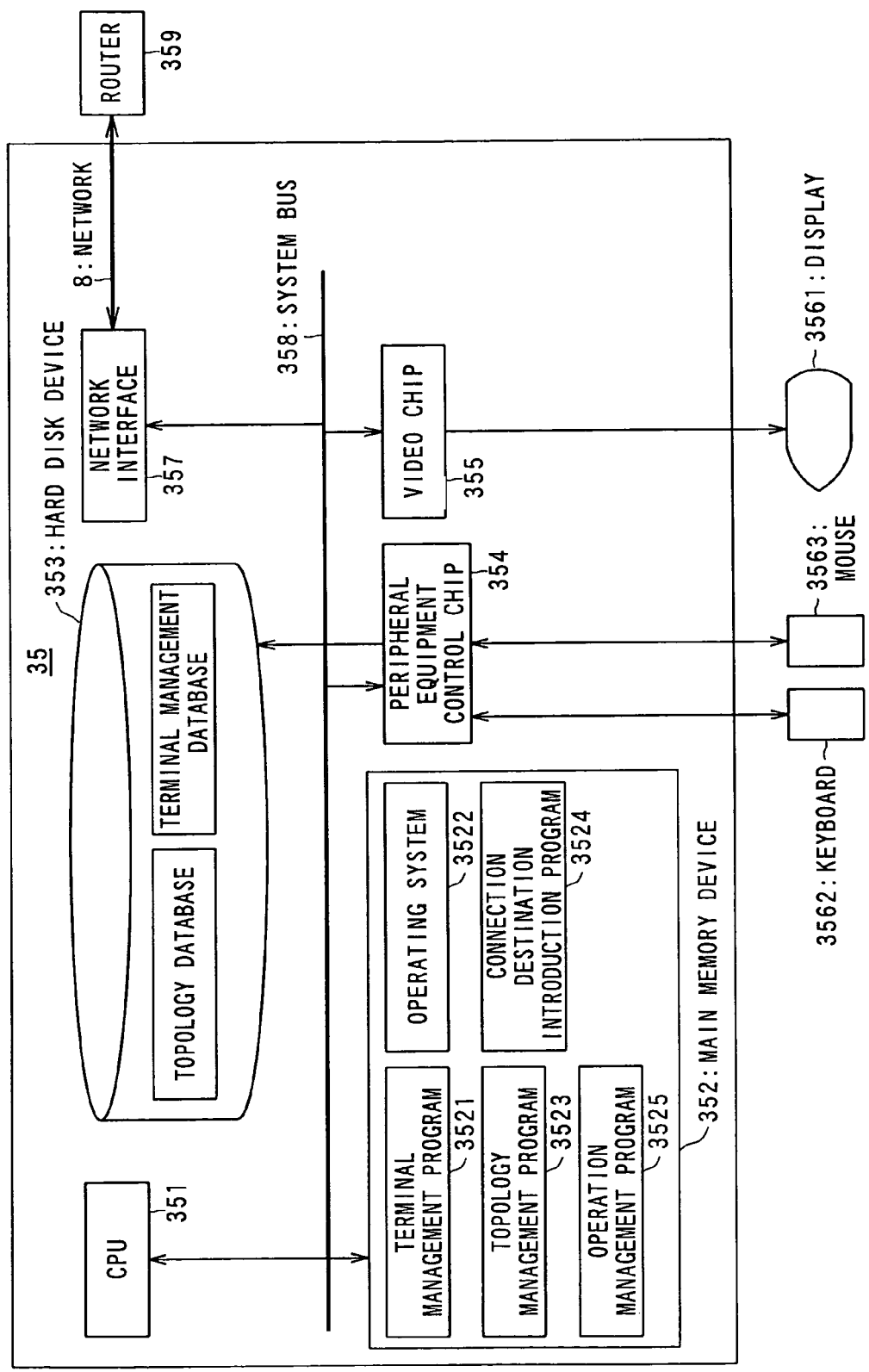
FIG. 9 is a view showing an example of a schematic configuration of a connection destination introduction server 35.

As shown in FIG. 9, the connection destination introduction server 35 includes: a CPU 351 having an operating function; a main memory device 352 including a terminal management program 3521, an operating system 3522, a topology management program 3523, a connection destination introduction program 3524, and an operation management program 3525, the main memory device 352 including an operation RAM, ROM, or the like, memorizing various data and programs; a hard disk device 353 for memorizing and saving (storing) topology database, the peripheral management database and programs or the like; a periphery device control chip 354 controlling connection with peripheral devices such as the hard disk device 353 and an input unit and transmitting information; a video chip 355 outputting a video signal for displaying images of characters and graphs necessary for GUI (graphical user interface) of the operating system 3522; a display 3561 such as CRT and a liquid crystal display that display an image based on the video signal outputted from the video chip 355; a keyboard 3562 and a mouse 3563 as an input unit accepting an instruction from the user and providing an instruction signal in response to the instruction to the CPU 351 through the peripheral device control chip 354; and a network interface 357 for controlling information communication with the other node device 32 or the like via a router 319 or the like through a network 8. The CPU 351, the main memory device 352, the periphery device control chip 354, the video chip 355, and the network interface 357 are mutually connected through a system bus 358. The video chip 355 is connected with an external display 356 and the peripheral device control chip 354 is connected to the external keyboard 3562 and the mouse 3563. The network interface 357 is connected with the external router 359 or the like through the network 8.

The CPU 351 executes various programs memorized in the main memory device 352 or the like to thereby integrally control the entire connection destination introduction server 35. Specifically, the CPU 351 can change conditions or the like in the terminal management program 3521 in response to the instruction signal from the input unit such as the keyboard 3562 and the mouse 3563, and can change policy or the like in the topology management program 3523 and the connection destination introduction program 3524. Further, the CPU 351 determines the connection destination candidate using the topology management program 3523 and the connection destination introduction program 3524, to the connection destination candidate request Sc from the node device 32 received through network 8 and the network interface 357, and returns the connection destination candidate notification Nk{ }.

[2.4. Configuration or the Like of Separation Synchronization Server]

Next, a configuration and a function of a separation synchronization server 36 as a separability control device according to the present invention are described with reference to a schematic configuration example of the separation synchronization server 36 shown in FIG. 10.

Figure 10:
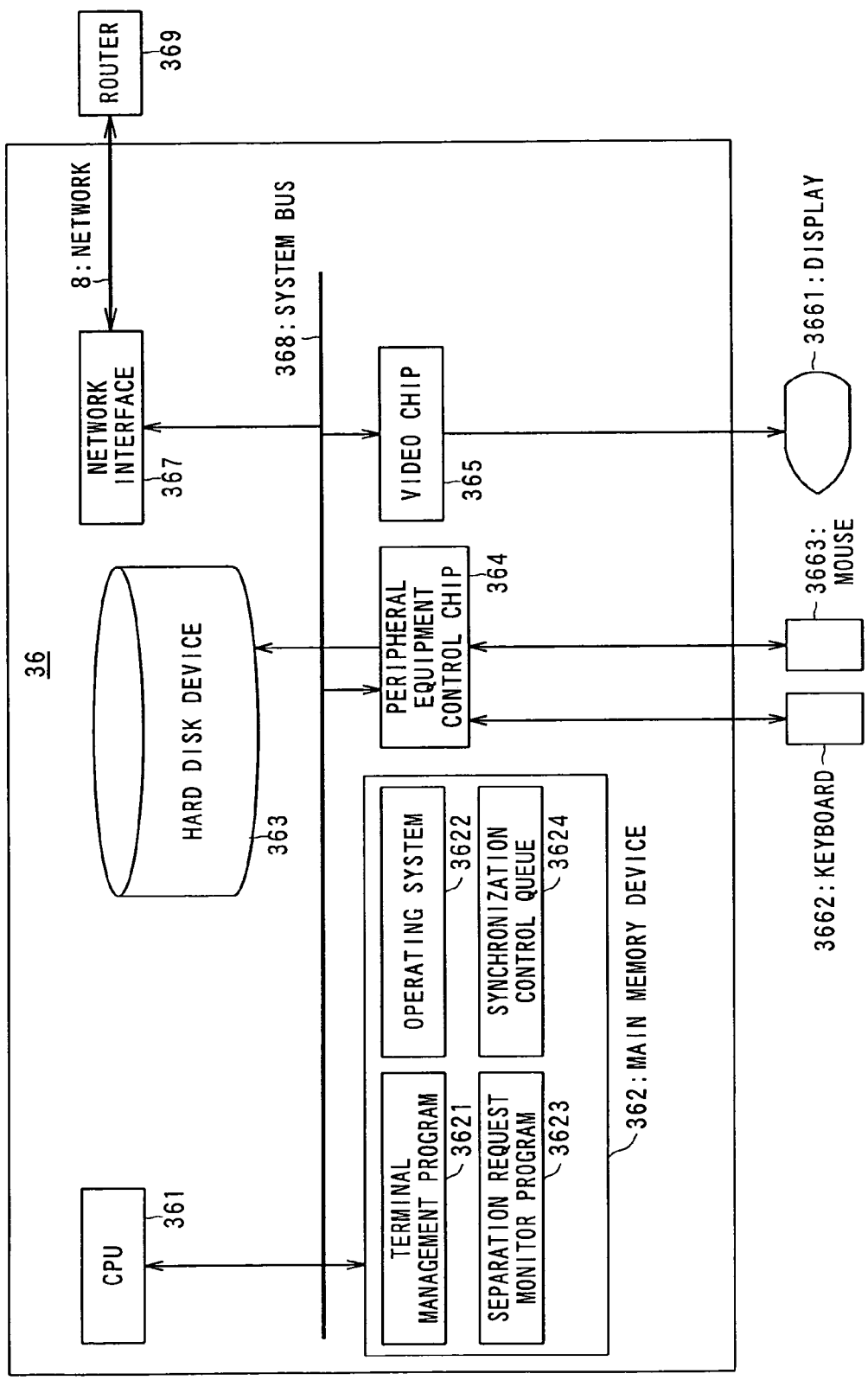
FIG. 10 is a view showing an example of a schematic configuration of a separation synchronization server 36.

As shown in FIG. 10, the separation synchronization server 36 includes: a CPU 361 having an operating function; a main memory device 362 including a terminal management program 3621, an operating system 3622, a separation request monitor program 3623, a synchronization control queue 3624 or the like as the separability control program according to the present invention, and the main memory device 362 including an operation RAM, ROM or the like, memorizing various data and programs; a hard disk device 363 including HD or the like for memorizing and saving (storing) various data and programs; a periphery device control chip 364 controlling connection with peripheral devices such as a hard disk device 363 and an input unit and transmitting information; a video chip 365 outputting a video signal for displaying images of characters and graphs necessary as GUI (graphical user interface) of the operating system 3622; a display 3661 such as CRT and a liquid crystal display that display an image based on the video signal outputted from the video chip 365; a keyboard 3662 and a mouse 3663 as an input unit accepting an instruction from the user and providing an instruction signal in response to the instruction to the CPU 361 through the peripheral device control chip 364; and a network interface 367 for controlling information communication with the other node device 32 or the like via a router 369 or the like through a network 8. The CPU 361, the main memory device 362, the periphery device control chip 364, the video chip 365, and the network interface 367 are mutually connected through a system bus 368. The video chip 365 is connected with an external display 3661 and the peripheral device control chip 364 is connected to the external keyboard 3662 and the mouse 3663. The network interface 367 is connected with the external router 369 or the like through the network 8.

The CPU 361 executes various programs memorized in the main memory device 362 or the like to integrally control the entire separation synchronization server 36. Specifically, the CPU 361 can change conditions or the like in the terminal management program 3621 in response to the instruction signal from the input unit such as the keyboard 3662 or the mouse 3663 and can change policy and execution authority or the like in the synchronization control queue 3624 including a separation request monitor program 3623, a queue Q1 and a queue Q2. Further, the CPU 361 returns the separation permission notification or the separation suspension instruction notification using the separation request monitor program 3623 and the synchronization control queue 3624, to the separation request Sr from the node device 32 received through the network 8 and the network interface 367. Further, the CPU 361 functions as the simultaneous separation process upper limit number determination means, the separation request information receiving means, the separation permission notification means, the separation process subtree identification means, the intervening node device number acquisition means, and the lower hierarchy level node device number acquisition means according to the present invention.

[3. Operation of Content Delivery System According to Present Embodiment]

Next, an operation of the respective devices in the content delivery system S according to the present embodiment is described with FIGS. 11 to 16. Here, in the following explanation of the operation of the respective devices, a node device connected as an immediate lower hierarchy level node device 32 with respect to the own node device 32 is referred to as "downstream node device 32", and a node device connected as an immediate upper hierarchy level node device 32 with respect to the own node device 32 is referred to as "upstream node device 32".

[3.1. Operation of Node Device]

Figure 12:
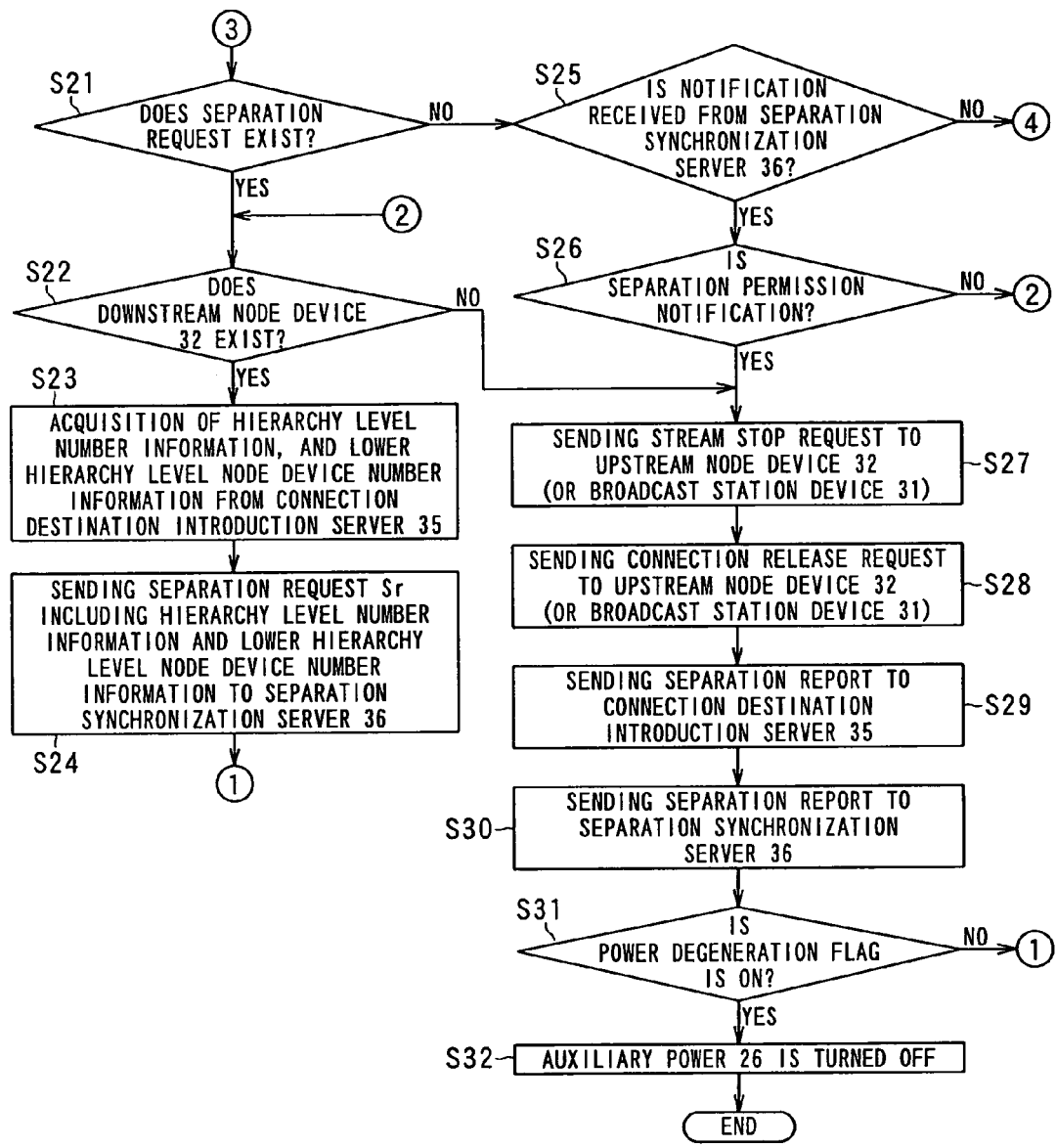
FIG. 12 is a flowchart showing a process (2) in the node device 32.
Figure 13:
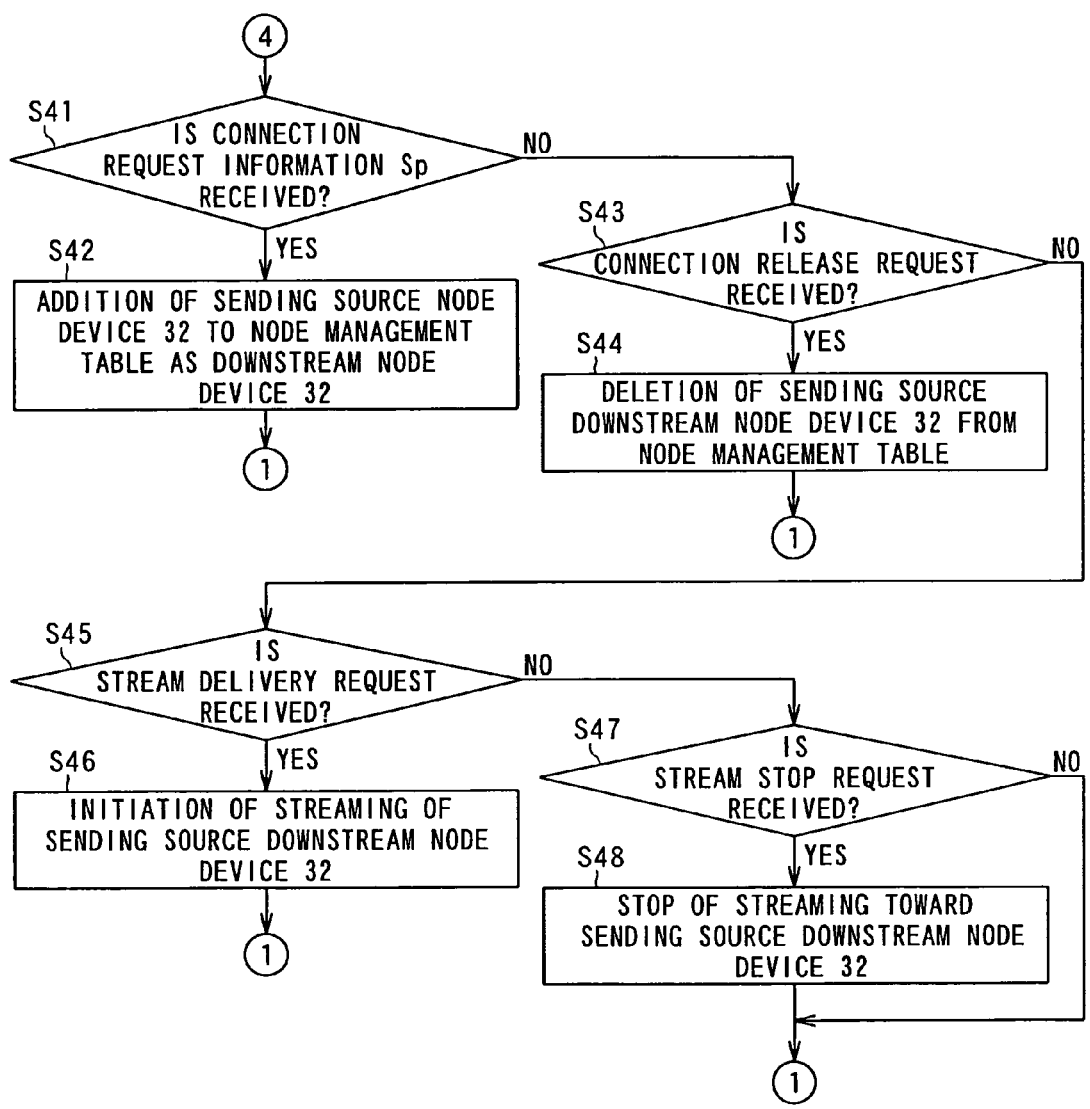
FIG. 13 is a flowchart showing a process (3) in the node device 32.

First, an operation of the node device 32 according to the present embodiment is described with reference to FIGS. 11 to 13.

Figure 11:
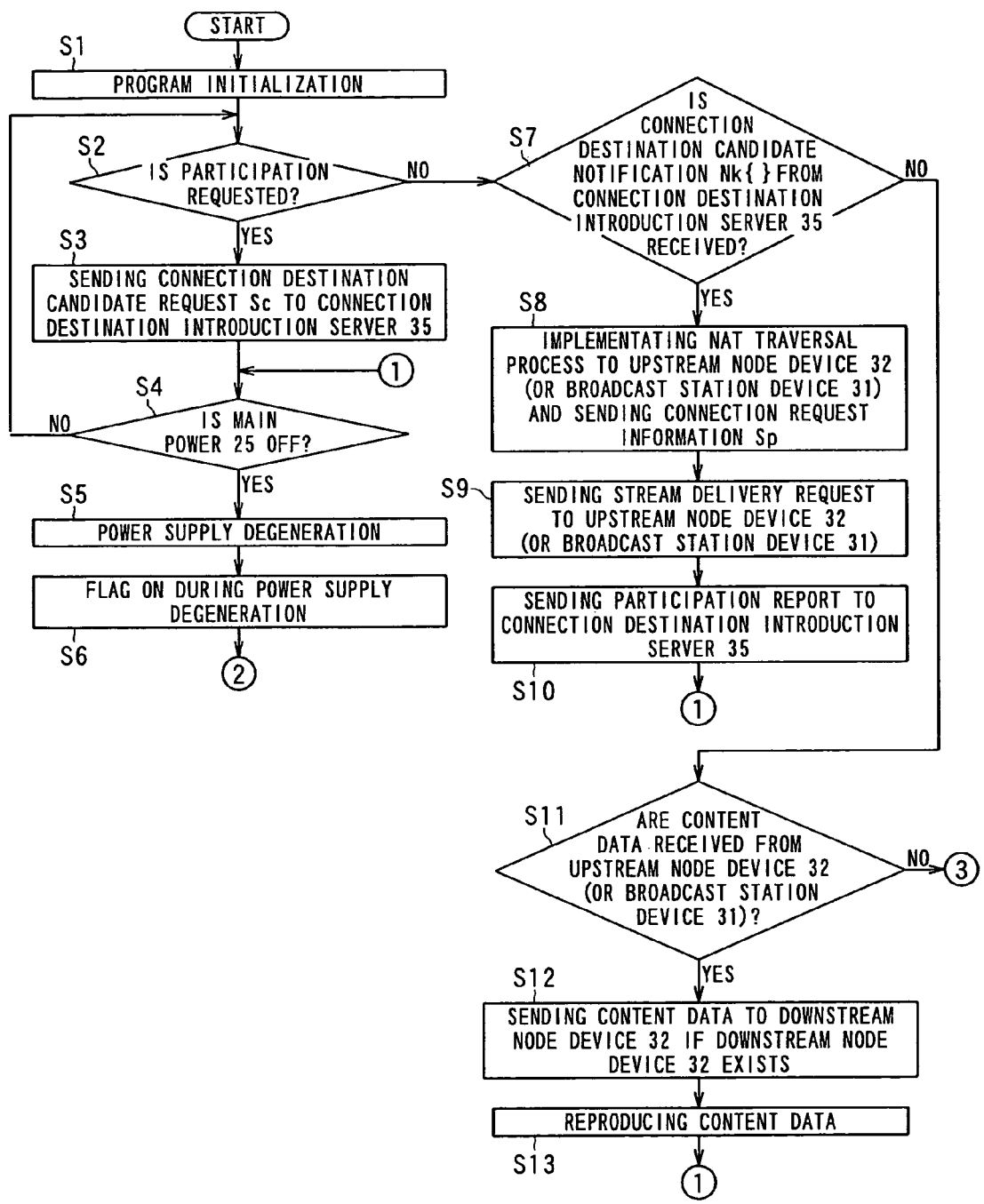
FIG. 11 is a flowchart showing a process (1) in the node device 32.

When recognizing that the own node device 32 is powered on by the user input remote controller 23 or the like, the CPU 11 of the node device 32 starts an information process shown in a flowchart of FIG. 11. Here, processes mentioned below are carried out based on the control of the CPU 11.

When the process is started, the CPU 11 initializes various setups of programs or the like of the node device 32 (Step S1), participation in the content delivery system S is selected by the user input remote controller 23 or the like, and it is judged whether or not participation is requested (Step S2). In a case where the participation is requested (Step S2: YES), the CPU 11 sends a connection destination candidate request Sc to a connection destination introduction server 35 so that the upstream node candidate to be connected is introduced (Step S3). The CPU 11 judges whether or not the main power 25 is turned off (Step S4). In a case where the main power 25 is not turned off (Step S4: NO), the process returns to the process of Step S2. In a case where the main power 25 is turned off (Step S4: YES), the power supply is degenerated (Step S5). Specifically, the CPU 11 switches power supply from the main power 25 to the auxiliary power 26 and activates only minimum members such as the main memory device 12 or the like which are necessary for stream relay. Then the CPU 11 turns ON the power degenerating flag (Step S6), and moves to Step S22 of FIG. 12.

On the other hand, in a case where the participation is not requested (Step S2: NO), it is judged whether or not a connection destination candidate notification Nk{ } including one or more upstream node candidates is received from a connection destination introduction server 35 (Step S7). In a case where one or more upstream node candidates are received from the connection destination introduction server 35 (Step S7: YES), all of the one or more upstream node candidates thus received or any one of the one or more upstream nodes are selected, and NAT (Network Address Translator) traversal process by UPnP (Universal Plug and Play Forum), UDP (User Datagram Protocol) Hole Punching or the like is carries out, and a connection request information Sp is sent (Step S8) Here, among the upstream node candidates obtained from the connection destination introduction server 35 in Step S7, the broadcast station device 31 other than the node device 32 already participating in the content delivery system S may be included. Further, the unit number of the upstream node device 32 (or broadcast station device 31) sending the connection request information Sp may be one or more. This is because the connection permit response is returned, and content data may be requested to deliver to the upstream node device 32 (or the broadcast station device 31) appropriately connected among the upstream node device 32 (or the broadcast station device 31) sending the connection request.

Subsequently, the NAT traverse process is appropriately carried out and a stream delivery request to deliver the content data delivered from the broadcast station device 31 is sent to the upstream node device 32 (or the broadcast station device 31) having sent the connection request information Sp (Step S9). When the stream delivery is received and participation in the content delivery system S is completed, a report of participation in the connection destination introduction server 35 is sent (Step S10). Then the process returns to Step S4.

Further, in a case where the connection destination candidate notification Nk{ } is not received from the connection destination introduction server 35 (Step S7: NO), it is judged whether or not the content data is received from the upstream node device 32 (or the broadcast station device 31) (Step S11). Here, it is judged whether or not receipt of a portion (packet) of the content data sent from the upstream node device 32 (or the broadcast station device 31) connected in the process of Steps S7 to S10 is initiated. In a case where the content data are received from the upstream node device 32 (the broadcast station device 31) (Step S11: YES) and the downstream node device 32 is connected lower than the own, the content data sent from the upstream node device 32 (or the broadcast station device 31) is sent to the downstream node device 32 (Step S12). In a case where the downstream node device 32 is not connected lower than the own node, in other words, the own node is located at an end of the content delivery system S, the content data may not be sent to the other node device 32.

Then, the content data received from the upstream node device 32 (or the broadcast station device 31) in Step S11 is reproduced (Step S13). Then the process returns to Step S4.

In the process of Step S11, in a case where the content data are not received from the upstream node device 32 (or the broadcast station device 31) (Step S11: NO), the process moves to FIG. 12 and separation from the content delivery system S is selected by the user input remote controller 23 or the like and it is judged whether or not separation is requested (Step S21). In a case where the separation is requested (Step S21: YES), the CPU 11 functions as a lower hierarchy level node device existence judge means, and it is judged whether or not the downstream node device 32 is connected lower than the own (Step S22). In a case where the downstream node device 32 is connected lower than the own (Step S22: YES), "the hierarchy level number information" indicating the own hierarchy level numbers from the connection destination introduction server 35 and "the lower hierarchy level node device number information" indicating the number of the node device 32 connected as the own lower hierarchy level are acquired (Step S23). Then the CPU 11 functions as a separation request information sending means and sends the separation request Sr including the hierarchy level number information and the lower hierarchy level node device number information that are acquired from the connection destination introduction server 35 (Step S24). The process returns to the process of Step S4.

On the other hand, in a case where the separation is not requested (Step S21: NO), it is judged whether or not notification on separability, in other words, the separation permission notification or the separation suspension instruction notification is received from the separation synchronization server 36 (Step S25). In a case where the notification is received from the separation synchronization server 36 (Step S25: YES), it is judged whether or not the notification is the separation permission notification (Step S26). In a case where it is not the separation permission notification (Step S26: NO), the process transits to Step S22.

Meanwhile, in a case where the notification is the separation permission notification (Step S26: YES), the CPU 11 functions as the separation process means and the process transits to the separation process of Step S27 onward. Here, in a case where the downstream node device 32 is not connected lower than the own based on the judge of the Step S22 (Step S22: NO), the process also transits to the separation process of Step S27 onward. Accordingly, even in a case where, for example, the notification received from the separation synchronization server 36 is not the separation permission notification in Step S25 (Step S26: NO) but the suspension instruction, and in a case where the downstream node device 32 connected lower than the own is connected to the other upstream node device 32 or it is separated from the tree with the broadcast station device 31 at a top, and the downstream node device 32 does not exist lower than the own, the separation process can be carried out by branch based on the judge of the Step S22 (S22: NO→S27).

In the separation process of Step S27 onward, a stream stop request is sent to the upstream node device 32 (or the broadcast station device 31) (Step S27), and a connection release request is sent to the upstream node device 32 (or the broadcast station device 31) (Step S28). Then, after connection with the upstream node device 32 (or the broadcast station device 31) is released, a separation report is sent to the connection destination introduction server 35, and subsequently a separation report is send to the separation synchronization server 36 (Step S30).

It is judged whether or not the power degenerating flag is turned ON (Step S31). In a case where the power degenerating flag is not turned ON (Step S31: NO), the process returns to Step S4. In a case where the power degenerating flag is turned ON (Step S31: YES), the auxiliary power 26 is turned off (Step S32) to thereby finish the process.

In Step S25, in a case where the notification is not received from the separation synchronization server 36 (Step S25: NO), the process goes to FIG. 13, and it is judged whether or not the connection request information Sp is received (Step S41). In a case where the connection request information Sp is received (Step S41: YES), the node device 32 of a connection request information Sp sending source is added to a node management table as the downstream node device 32 to make it the downstream node device 32 (Step S42). The connection permit response is sent to the sending source node device 32 and the process returns to Step S4.

On the other hand, in a case where the connection request information Sp is not received (Step S41: NO), it is judged whether or not the connection release request is received (Step S43). In a case where the connection release request is received (Step S43: YES), the downstream node device 32 of the connection release request sending source is deleted from the node management table (Step S44) to separate the downstream node device 32. The process returns to Step S4.

In a case where the connection release request is not received (Step S43: NO), it is judged whether or not a stream delivery request is received (Step S45). In a case where the stream delivery request is received (Step S43: YES), transfer (streaming) of the content data to the downstream node device 32 of the stream delivery request sending source starts (Step S46). The process returns to Step S4.

In a case where the stream delivery request is not received (Step S45: NO), it is judged whether or not the stream stop request is received (Step S47). In a case where the stream stop request is received (Step S47: YES), transfer (streaming) of the content data to the downstream node device 32 of the stream stop request sending source stops (Step S48). The process returns to Step S4.

[3.2. Operation of Connection Destination Introduction Server 35]

Figure 14:
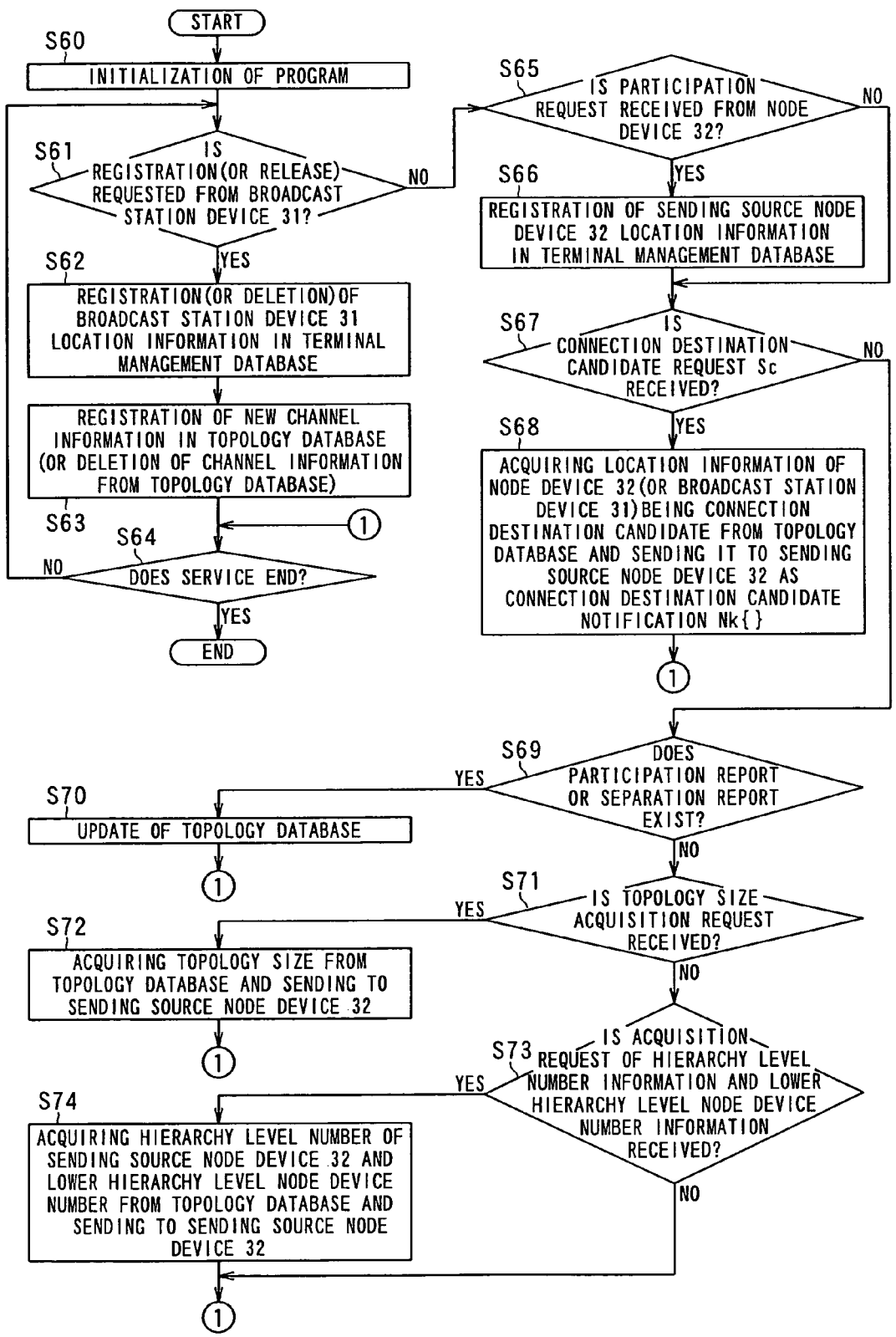
FIG. 14 is a flowchart showing a process in the connection destination introduction server 35.

Next, an operation of the connection destination introduction server 35 according to the present embodiment is described with reference to FIG. 14. Here the processes mentioned below are carried out based on the control of the CPU 351.

When recognizing that the connection destination introduction service starts by an external instruction through the network interface 357 or input or the like of input unit such as the keyboard 3562, the CPU 351 of the connection destination introduction server 35 starts the process (Start).

When the process is initiated, the CPU 351 initializes various setups of programs or the like of the connection destination introduction server 35 (Step S60), it is judged whether or not registration (or release) is requested from the broadcast station device 31 (Step S61). In a case where the registration or release is requested from the broadcast station device 31 (Step S61: YES), location information (IP address or the like) of the broadcast station device 31 is registered or released in a terminal management database in response to the request (Step S62). Next, channel information of the broadcast station device 31 is registered or released in a topology database (Step S63). It is judged whether or not service as the connection destination introduction server is finished based on input from the keyboard 3562 or the like and the instruction or the like through the network interface 357 (Step S64). In a case where service of the connection destination introduction server is finished, the process ends (Step S64: YES). In a case where the service of the connection destination introduction server is not finished (Step S64: NO), the process returns to Step S61. Here, in Steps S61 to S63, the process of registration request or release request from the broadcast station device 31 is described. However, processes coping with a registration request or a release request from the other broadcast station device but the broadcast station device 31, or a request of registration in or release from the database of the broadcast station device newly established are carried out by the process similar to the above process.

In Step S61, in a case where the registration request or the release request of the broadcast station device does not exist (Step S61: NO), it is judged whether or not a participation request is received from the node device 32 (Step S65). In a case where the participation request is received (Step S65: YES), location information (IP address or the like) of the node device 32 being a participation request sending source is registered in a terminal management database (Step S66).

In a case where the participation request is not received from the node device 32 (Step S65: NO), it is judged whether or not the connection destination introduction request Sc is received from the node device 32 (Step S67). In a case where the connection destination introduction request Sc is received (Step S67: YES), the location information (IP addresses or the like) of the node device 32 to be a candidate of the connection destination is acquired from the topology database, and the location information of the node device 32 (or the broadcast station device 31) to be a candidate of the connection destination is sent to the node device 32 being a request source as a connection destination candidate notification Nk{ } (Step S68). Then, the process returns to Step S64.

In Step S67, in a case where the connection destination introduction request Sc is not received (Step S67: NO), it is judged whether or not a topology participation report or a separation report by participating in the content delivery system S is provided from the node device 32 (Step S69). In a case where the topology participation report or the separation report is provided from the node device 32 (Step S69: YES), information about a topology change caused by participation or separation of the node device 32 in or from the content delivery system S is registered in the database (or updated) (Step S70). Then the process returns to Step S64.

Next, in Step S69, in a case where the topology participation report or the separation report is not provided from the node device 32 (Step S69: NO), it is judged whether or not a topology size acquisition request is received (Step S71). In a case where the topology size acquisition request is received (Step S71: YES), the topology size is acquired from the topology database and sent to the node device 32 being the sending source of the topology size acquisition request (Step S72). Then the process returns to Step S64.

In Step S71, in a case where the topology size acquisition request is not received (Step S71: NO), it is judged whether or not an acquisition request of hierarchy level number information and lower hierarchy level node device number information is received (Step S73). In a case where the acquisition request of the hierarchy level number information and the lower hierarchy level node device number information is received (Step S73: YES), the hierarchy level number and the lower hierarchy level node device number of the node device 32 being the sending source of the acquisition request of the hierarchy level number information and the lower hierarchy level node device number information are acquired from the topology database and sent to the node device 32 being the request source (Step S74). Then the process returns to Step S4. In Step S73, in a case where the topology size acquisition request is not received (Step S73: NO), the process also returns to Step S64.

[3.3. Operation of Separation Synchronization Server 36]

Figure 15:
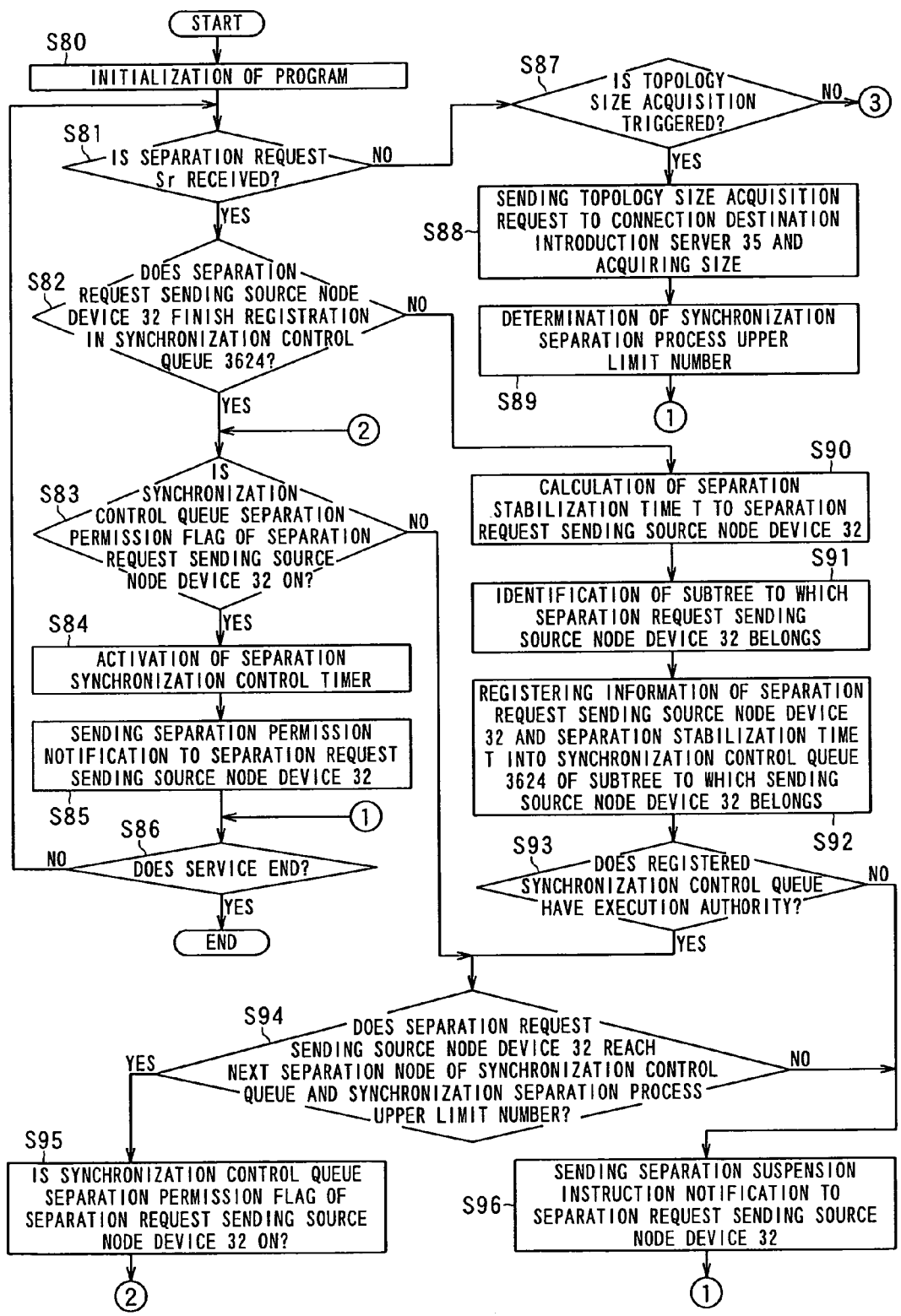
FIG. 15 is a flowchart showing a process (1) in the separation synchronization server 36.
Figure 16:
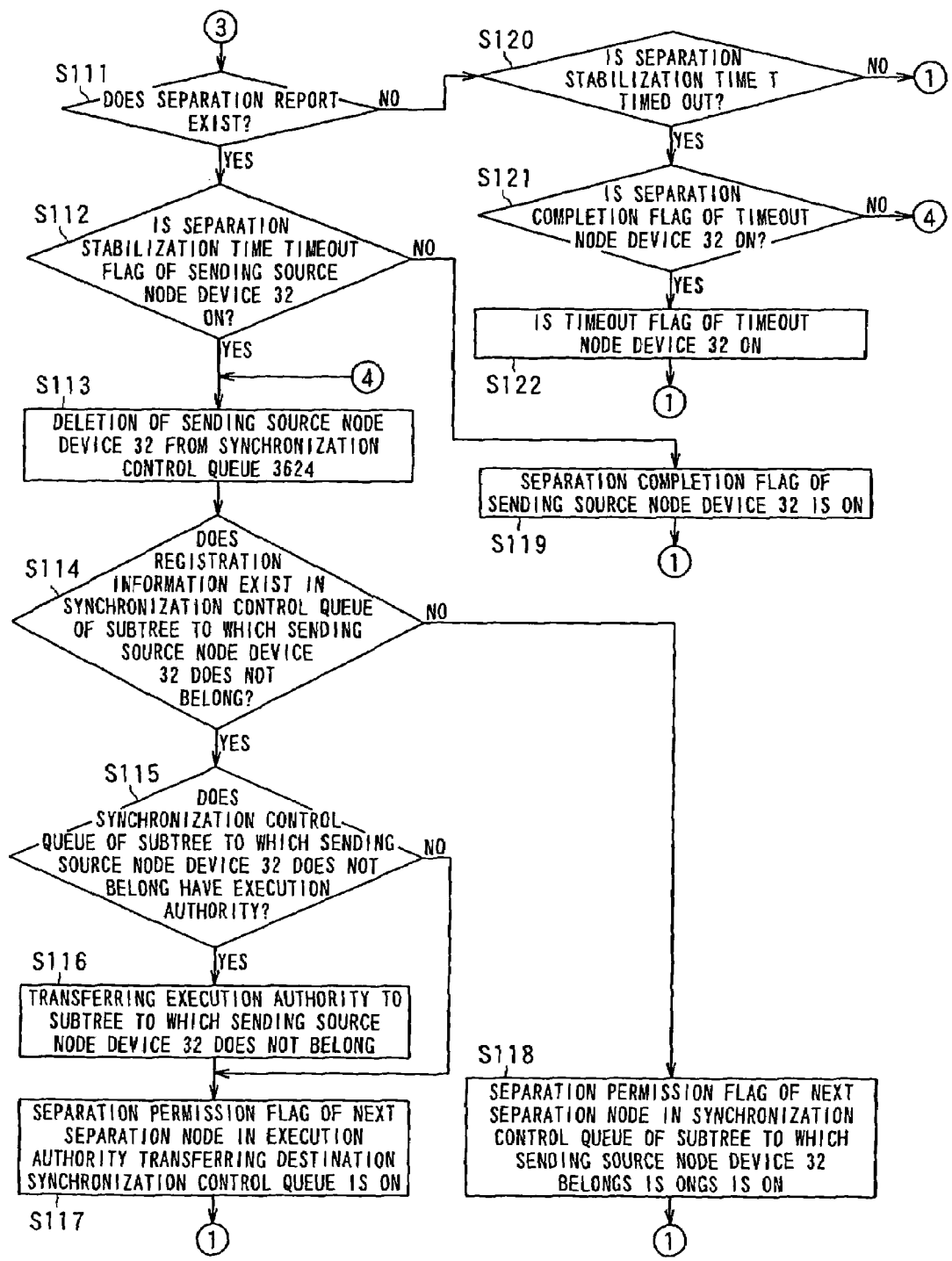
FIG. 16 is a flowchart showing a process (2) in the separation synchronization server 36.

Next, an operation of the separation synchronization server 36 according to the present embodiment is described with reference to FIGS. 15 and 16. Here processes mentioned below are carried out based on the control of the CPU 361.

When recognizing that a separation request monitor service starts by an external instruction through the network interface 367 or input or the like from the input unit such as the keyboard 3662, the CPU 361 of the separation synchronization server 36 starts the process (Start).

When the process is initiated, the CPU 361 initializes various setups of programs or the like of the separation synchronization server 36 (Step S80), and it is judged whether or not separation request Sr is received from the node device 32 (Step S81). In a case where the CPU 361 functions as the separation request information receiving means, and the separation request Sr is received from the node device 32 (Step S81: YES), it is judged whether or not the node device 32 being the separation request sending source is registered in a synchronization control queue 3624 (Step S82). Next, in a case where it is registered (Step S82: YES), it is judged whether or not a synchronization control queue separation permission flag of the node device 32 being the separation request sending source is ON (Step S83).

In a case where the synchronization control queue separation permission flag of the node device 32 being the separation request sending source is ON (Step S83: YES), a separation synchronization control timer by separation stabilization time T and current time is stated up and counting of a timeout time is started (Step S84), the CPU 361 functions as a separation permission notification means, and the separation permission notification is sent to the node device 32 being the separation request sending source (Step S85). Then it is judged whether or not service as the separation synchronization server finishes, based on the input from the keyboard 3662 or the like and the instruction or the like through the network interface 367 (Step S86). In a case where the separation synchronization server service is not finished (Step S86: NO), the process returns to Step S81.

In Step S81, in a case where the separation request Sr is not received (Step S81: NO), it is judged whether or not it is a time (acquisition trigger) to acquire the topology size (Step S87). In a case where it is topology size acquisition trigger (Step S83: YES), the topology size acquisition request is sent to the connection destination introduction server 35, and a number of the node devices 32 participating in the current content delivery system S is acquired as the topology size (Step S88). Then the CPU 361 functions as the synchronization separation process number determination means and calculates and determines the synchronization separation process upper limit number (Step S89). Then the process returns to Step S86.

In Step S82, in a case where the node device 32 being separation request sending source is not registered in the synchronization control queue 3624 (Step S82: NO), the separation stabilization time T with respect to the node device 32 being the separation request sending source is calculated by the above-mentioned formula (I) (Step S90). Next, the CPU 361 functions as the separation processing subtree identification means, and the subtree to which the node device 32 of the separation request sending source belongs is identified (Step S91).

Then after various pieces of information including the separation stabilization time T of the node device 32 being the separation request sending source is registered in the synchronization control queue 3624 to which the sending source node device 32 belongs (Step S92), it is judged whether or not the synchronization control queue registered here (queue Q1 or queue Q2) has execution authority (Step S93). In a case where the synchronization control queue thus registered has execution authority (Step S93: YES), it is judged whether or not the node device 32 being the separation request sending source is registered as a separation node next to the synchronization control queue and whether or not it does not reach the synchronization separation process upper limit number (Step S94). In a case where the node device 32 being the separation request sending source is registered as a separation node next to the synchronization control queue, and it does not reach the synchronization separation process upper limit number (Step S94: YES), the synchronization control queue separation permission flag of the node device 32 being the separation request sending source is turned ON (Step S95). Then the process returns to Step S83.

On the other hand, in a case where thus registered synchronization control queue has no execution authority in Step S93 (Step S93: NO), or in a case where in Step S94 condition that the node device 32 being the separation request sending source is registered as a separation node next to the synchronization control queue and it does not reach the synchronization separation process upper limit number is not satisfied (Step S93: NO), a separation suspension instruction notification is sent to the node device 32 being the separation request sending source (Step S96). Then the process returns to Step S86.

In Step S87, in a case where it is not the topology size acquisition trigger (Step S87: NO), the process goes to FIG. 16, and it is judged whether or not a separation report is provided from the node device 32 (Step S111). In a case where the separation report is provided from the node device 32 (Step S111: YES), it is judged whether or not the separation stabilization time timeout flag of the node device 32 being the separation report sending source is ON (Step S112). In a case where the separation stabilization time timeout flag is ON (Step S112: YES), the node device 32 being the separation report sending source is deleted from the synchronization control queue 3624 (Step S113). It is judged whether or not the registration information exists in the synchronization control queue of the subtree to which the node device 32 being the separation report sending source does not belong (whether or not the registration of the node device 32 exists) (Step S114). In a case where the registration information exists in the synchronization control queue of the subtree to which the node device 32 being the separation report sending source does not belong (Step S114: YES), it is judged whether or not the synchronization control queue of the subtree to which the node device 32 being the separation report sending source belongs has execution authority currently (Step S115). In a case where it has no execution authority (Step S115: NO), the process goes to Step S117. In a case where it has the execution authority (Step S115: YES), the execution authority is moved to the synchronization control queue of the subtree to which the node device 32 being the separation report sending source does not belong (Step S116). Next, in Step S117, the separation permission flag of the node device 32 registered as a next separation node in the synchronization control queue of the execution authority moving source is turned ON (Step S117). Then the process returns to Step S86.

In Step S114, in a case where registration information does not exist in the synchronization control queue of the subtree to which the node device 32 being the separation report sending source does not belong (Step S114: NO), the separation permission flag of the node device 32 registered as the next separation node in the synchronization control queue of the subtree to which the node device 32 being the separation report sending source belongs is turned ON (Step S118). Then the process returns to Step S86. Further, in Step S112, in a case where the separation stabilization time timeout flag of the node device 32 being the separation report sending source is not turned ON (Step S112: NO), the separation completion flag of the node device 32 being the separation report sending source is turned ON (Step S119). Then the process returns to Step S86.

In Step S111, in a case where the separation report is not received from the node device 32 (Step S111: NO), it is judged whether or not the node device 32 in which the separation stabilization time T is timed out exists in the synchronization control queue (Step S120). In a case where the node device 32 in which the separation stabilization time T is timed out does not exist (Step S120: NO), the process returns to Step S86. On the other hand, in a case where the node device 32 in which the separation stabilization time T is timed out exists (Step S120: YES), it is judged whether or not the separation completion flag of the node device 32 thus timed out is turned ON (Step S121). In a case where the separation completion flag of the node device 32 thus timed out is not turned ON (Step S121: NO), the process returns to Step S113. In a case where the separation completion flag is turned ON (Step S121: YES), the timeout flag of the node device 32 thus timed out is tuned ON (Step S122). Then the process returns to Step S86.

As described, according to the present embodiment, the separation control server 36 acquires the number of node devices 32 participating in the content delivery system S as a topology size, determines the synchronization separation process upper limit number based on the topology size, receives the separation request Sr from any one of the participating node devices 32. In a case where the number of the node devices 32 in separation process does not reach the synchronization separation process upper limit number, separation of the node device 32 being the separation request Sr sending source is permitted. In a case where the number of the node devices 32 in separation process reaches the synchronization separation process upper limit number, it is configured such that the separation is not permitted to the node device 32 being the separation request Sr sending source. According to such the configuration, since the simultaneous multiple separation processes of the node device 32 are prevented from occurring delivery stop (delivery interruption) in the delivery topology of the entire content delivery system S, it is possible to improve topology stability.

Here, according to the above-described embodiment, although the content delivery system S made up of two subtrees A and B, for example, in a case where "n" units of node devices 32 are connected as the immediately lower hierarchy level with respect to the broadcast station device 31, the content delivery system S is made up of "n" pieces of subtrees. In this case, it may be controlled so that the execution authority for permitting the separation is moved to prevent separations from simultaneously occurring in all the subtrees. In other words, the separation control server 36 identifies the subtree to which the node device 32 in separation process to separate from the tree-type delivery system S belongs among "n" pieces of subtrees forming "n" units of node devices 32 as a top hierarchy level, which are connected to the immediately lower hierarchy level with respect to the broadcast station device 31, and receives the separation request Sr from any one of the participating node devices 32. In a case where the subtree to which the node device 32 being the separation request Sr sending source belongs is same as the subtree in currently process, separation is permitted to the node device 32 being the separation request Sr sending source. In a case where the subtree to which the node device 32 being the separation request Sr sending source belongs is different from the subtree in currently processing, it is configured that the separation is instructed to suspend to the node device 32 being the separation request Sr sending source. According to such the configuration, since the separation of the node is only permitted from a single subtree among a group of subtrees forming the delivery topology, it is possible to localize disturbance of the delivery topology due to the separated node and end up stabilizing the delivery topology.

Further, it is configured that the separation control server 36 permits the separation on priority basis to the node device 32 having a large number of the intervening node devices which is the number of node devices 31 intervening between the node device 32 being the separation request Sr sending source and the broadcast station device 31. Further, it is configured that the separation control server 36 permits the separation on priority basis to the node device 32 having a small number of the lower hierarchy level node devices of the node device 32 being the separation request Sr sending source. In other words, it is possible to reduce a sum value of the separation suspension time in the synchronization control queue with respect to plural node devices 32 simultaneously issuing separation requests.

Further, in addition to the above, for example, in a case where a process time of Task A is set up to "1", a process time of Task B is "2", a process time of Task C is "3", a process time of Task D is "4", and a process time of Task E is "5", as shown in FIG. 17, (I) In case of processing order of (A)→(B)→(C)→(D)→(E), as to respective task waiting times, a waiting time of Task A is "0", a waiting time of Task B is "1", a waiting time of Task C is "3", a waiting time of Task D is "6", and a waiting time of Task E is "10". (II) In case of processing order of (E)→(D)→(C)→(B)→(A), as to respective task waiting times, the waiting time of Task E is "0", the waiting time of Task D is "5", the waiting time of Task C is "9", the waiting time of Task B is "12", and the waiting time of Task A is "14".

When Tasks A to E simultaneously arrive, the sum value of respective task waiting times decreases as the processes are done in an increasing order of the process times.

According to the control of the present embodiment, because of limitation that when the separation request node separates, the next task is required to be suspended for a period of separation stabilization time, the processes are carried out in the increasing order of the separation stabilization time.

Further, in Step S22, it is judged whether or not there exists any downstream node device 32, in other words, whether or not the own is the node device at the end. In a case where it is the node device at the end, it is configured that the process immediately goes to the separation process in Step S27 and onward without being permitted to separate the separation synchronization server 36. According to such the configuration, it is possible that the node devices 32 having the topology configuration free of separation influences carry out the separation processes smoothly.

Here, although the above-described embodiment is explained as an example of the present invention, the present invention is not limited thereto but may be the modified embodiment described below.

According to the above-described embodiment, although the content delivery system S has the connection destination introduction server 35 and the separation synchronization server 36, the configuration is not limited thereto. It may be configured that the broadcast station device 31 of the content delivery system S functions as respective servers 35 and 36 instead of having these server devices in the system S. Here, the broadcast station device 31 functions as the delivery device and the separability control device of the present invention. Accordingly, roles respective of the devices may change under such the configuration. For example, according to the above-described embodiment, the separation synchronization server 36 acquires the topology size, hierarchy level number information and the lower hierarchy level node device number information from the connection destination introduction server 35. However, in a case where the broadcast station device 31 memorizes the connection mode of the broadcast station device 31 and respective node devices 32, as the topology management information (topology database), it may be configured that the separation synchronization server 36 acquires the topology size, the hierarchy level number information and the lower hierarchy level node device number information from the broadcast station device 31. Further, in a case where the separation synchronization server 36 itself memorizes the connection mode of the broadcast station device 31 and respective node devices 32, as the topology management information (topology database), it may be configured that the topology size, the hierarchy level number information and the lower hierarchy level node device number information are acquired from the topology database.

According to the above-described embodiment, although it is not specifically described, the content data delivered by the content delivery system S and viewed in the node device 32 may be converted so as to decrease a data amount or to be suitable for viewing.

Programs coping with respective operations of the node device 32, the broadcast station device 31, the connection destination introduction server 35, and the separation synchronization server 36 described above are recorded in information recording media such as flexible disk and hard disk or acquired and recorded through a network such as the internet. These are read out by a microcomputer or the like and carried out, and the microcomputer may be caused to function as CPU 11, CPU 311, CPU 351 or CPU 361 according to the respective embodiments.

The present invention is not confined to the configuration listed in the foregoing embodiments, but it is easily understood that the person skilled in the art can modify such configurations into various other modes, within the scope of the present invention described in the claims.

What is claimed is:

1. A control device controlling separability of a node device from a tree-type delivery system formed by participation of a plurality of node devices by connecting the plurality of node devices in a tree-like shape through a communication unit while forming a plurality of hierarchy levels placing a delivery device at a top thereof to enable content data delivered from the delivery device to be sequentially transferred from the node device on an upper hierarchy level to another node device on a lower hierarchy level, the control device comprising:

a first acquiring unit that acquires a number of the plurality of node devices participating in the tree-type delivery system, a determining unit that determines an upper limit number of the node devices that are permitted to separate simultaneously from the tree-type delivery system, based on the number of the participating node devices acquired by the first acquiring unit;

a receiving unit that receives separation request information of requesting separation from the tree-type delivery system from any one of the node devices;

a judging unit that judges whether or not the number of the node devices currently under a separation process reaches the upper limit number, based on the separation request information received by the receiving unit, and a notification unit that sends a separation permission notification of permitting the separation process to the node device being a separation request information sending source in a case where it is judged by the judging unit that the number of the node devices currently under the separation process does not reach the upper limit number, and that does not send the separation permission notification to the node device being the separation request information sending source in a case where it is judged by the judging unit that the number of the node devices currently under the separation process reaches the upper limit number.

2. The control device according to claim 1, wherein the notification unit sends a separation suspension instruction notification of instructing suspension of a separation process to the node device being the separation request information sending source in a case where the number of the node devices currently under the separation process reaches the upper limit number.

3. The control device according to claim 2, further comprising:
an identification unit that identifies a subtree to which the node device currently under the separation process from the tree-type delivery system belongs, among "n" pieces of subtrees that are formed by placing "n" units of the node devices at tops thereof, the node devices being connected to an immediately lower hierarchy level with respect to the delivery devices,
wherein the notification unit sends the separation permission notification to the node device being separation request information sending source in a case where the subtree to which the node device being the separation request information sending source belongs is identical to the subtree identified by the identification unit, and sends the suspension instruction notification to the node device being the separation request information sending source in a case where the subtree to which the node device being the separation request information sending source belongs is different from the subtree identified by the identification unit.

4. The control device according to claim 1, further comprising:
a second acquiring unit that acquires a node device number being a number of the node devices intervening between the delivery device and the node device being the separation request information sending source,
wherein the notification unit sends the separation permission notification on a priority to the node device having a large number of the node devices among the node devices being the separation request information sending source in a case where the separation request information is received from the plural node devices.

5. The control device according to claim 1, further comprising:
third acquiring unit that acquires a lower hierarchy level node device number being a number of the node devices connected to a lower hierarchy level with respect to the node device being the separation request information sending source,
wherein the notification unit sends the separation permission notification on a priority basis to the node device having a small number of the lower hierarchy level node devices acquired by the third acquiring unit among the node devices being the separation request information sending source in a case where the separation request information is received from the plural node devices.

6. A tree-type delivery system formed by participation of a plurality of node devices by connecting the plurality of node devices in a tree-like shape through a communication unit while forming a plurality of hierarchy levels placing a delivery device at a top thereof to enable content data delivered from the delivery device to be sequentially transferred from a node device on an upper hierarchy level to another node device on a lower hierarchy level,
wherein the node device comprises:
a sending unit that sends separation request information of requesting separation from the tree-type delivery system with respect to a control device that controls separability from the tree-type delivery system;
notification receiving unit that receives a separation permission notification permitting a separation process from the control device; and
a separation process unit that carries out a process of separation from the tree-type delivery system in a case where the separation permission notification is received, and
the control device comprises:
a first acquiring unit that acquires a number of the node devices participating in the tree-type delivery system,
a determining unit that determines an upper limit number of the plurality of node devices that are permitted to separate simultaneously from the tree-type delivery system on the basis of on the number of the participating node devices acquired by the first acquiring unit;
a receiving unit that receives separation request information of requesting a separation from the tree-type delivery system from any one of the node devices;
a judging unit that judges whether or not the number of the node devices currently under the separation processing reaches the upper limit number, based on the separation request information received by the receiving unit, and
a notification unit that sends the separation permission notification to a node device being a separation request information sending source in a case where it is judged by the judging unit that the number of the node devices currently carrying out the separation process does not reach the upper limit number, and that does not send the separation permission notification to the node device being the separation request information sending source in a case where it is judged by the judging unit that the number of the node devices currently carrying out the separation process reaches the upper limit number.

7. The tree-type delivery system according to claim 6,
wherein the notification unit of the control device sends a separation suspension instruction notification of instructing suspension of the separation process to the node device being the separation request information sending source in a case where the number of the node devices currently carrying out the separation process reaches the upper limit number.

8. The tree-type delivery system according to claim 7,
wherein the control device further comprises:
an identification unit that identifies a subtree, to which a node device under a separation process of currently separating from the tree-type delivery system belongs, among "n" pieces of subtrees that form "n" units of the node devices connected to an immediately lower hierarchy level with respect to the delivery devices while placing the node device at its top position,
wherein the notification unit sends the separation permission notification to the node device being the separation request information sending source in a case where the subtree, to which the node device being the separation request information sending source belongs, is identical to the subtree identified by the identification unit, and sends the suspension instruction notification to the node device being the separation request information sending source in a case where the subtree, to which the node device being the separation request information sending source belongs, is different from the subtree identified by the identification unit.

9. The tree-type delivery system according to claim 6,
wherein the control device further comprises:
an acquiring unit that acquires a node device number being a number of the node devices intervening between the delivery device and the node device being the separation request information sending source, and
the notification unit sends the separation permission notification on a priority to the node device having a large number of intervening node devices among the node devices being the separation request information sending source in a case where the separation request information is received from the plural node devices.

10. The tree-type delivery system according to claim 6, wherein the control device further comprises:
a lower hierarchy level node device number acquiring unit that acquires a lower hierarchy level node device number being a number of the node devices connected to a lower hierarchy level with respect to the node device being the separation request information sending source, source, and
the notification unit sends the separation permission notification by priority to the node device having a small number of the lower hierarchy level node devices among the node devices being the separation request information sending source in a case where the separation request information is received from the plurality of node devices.

11. The tree-type delivery system according to claim 6, wherein the node device further comprises:
a judging unit that judges, in a case where the node device separates from the tree-type delivery system, whether or not a node device connected to the lower hierarchy level with respect to the separating node device exists, and
the sending unit does not send the separation request information, and the separation process unit carries out the separation process from the tree-type delivery system, in a case where it is judged by the judging unit that a node device connected to the lower hierarchy level with respect to the separating node device does not exist.

12. A control method in a tree-type delivery system formed by participation of a plurality of node devices by connecting the plurality of node devices in a tree-like shape through a communication unit while forming a plurality of hierarchy levels placing a delivery device at a top thereof to enable content data delivered from the delivery device to be sequentially transferred from a node device on an upper hierarchy level to another node device on a lower hierarchy level,
the control method including steps in the node device and steps in the control device,
the steps in the node device comprising:
sending separation request information of requesting separation from the tree-type delivery system to a control device that controls separability from the tree-type delivery system;
the steps in the control device comprising:
acquiring the number of the node devices participating in the tree-type delivery system, and determining an upper limit number of the node devices that are permitted to simultaneously separate from the tree-type delivery system on the basis of the number of the participating node devices;
receiving separation request information of requesting a separation from the tree-type delivery system, from any one of the node devices; and
judging whether or not the number of the node devices currently under the separation process reaches the upper limit number, sending the separation permission notification to the node device being the separation request information sending source in a case where the number of the node devices currently under the separation process does not reach the upper limit number, and not sending the separation permission notification to the node device being the separation request information sending source in a case where the number of the node devices currently under the separation process reaches the upper limit number; and
the steps in the node device further comprising:
receiving the separation permission notification permitting the separation process from the control device; and
carrying out the separation process from the tree-type delivery system in a case where the separation permission notification is received.

13. A non-transitory computer-readable medium that stores a computer-executable program for a control device that controls separability of a node device from a tree-type system formed by participation of a plurality of node devices by connecting the plurality of node devices in a tree-like shape through a communication unit while forming a plurality of hierarchy levels placing a delivery device at a top thereof to enable content data delivered from the delivery device to be sequentially transferred from a node device on an upper hierarchy level to another node device on a lower hierarchy level, the nontransitory computer readable storage medium being installed in the control device performing the following steps:
acquiring a number of the plurality of node devices participating in the tree-type delivery system,
determining an upper limit number of the plurality of node devices that are permitted to separate simultaneously from the tree-type delivery system, based on the number of the participating node devices thus acquired;
receiving separation request information of request information of requesting separation from the tree-type delivery system from any one of the node devices
judging whether or not the number of the node devices currently under a separation process reaches the upper limit number based on the separation request information thus received and
sending a separation permission notification of permitting the separation process to the node device being a separation request information sending source in a case where it is judged that the number of the node device currently under the separation process does not reach the upper limit, and
not sending the separation permission notification to the node device being the separation request information sending source in a case where it is judged that the number of the node devices currently under the separation process reaches the upper limit.

* * * * *